(12) United States Patent
Ikeda et al.

(10) Patent No.: US 7,508,986 B2
(45) Date of Patent: Mar. 24, 2009

(54) DOCUMENT RECOGNITION DEVICE, DOCUMENT RECOGNITION METHOD AND PROGRAM, AND STORAGE MEDIUM

(75) Inventors: Hiroaki Ikeda, Tokyo (JP); Keiko Nakanishi, Tokyo (JP); Taeko Gotoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 10/997,537

(22) Filed: Nov. 23, 2004

(65) Prior Publication Data

US 2005/0117803 A1    Jun. 2, 2005

(30) Foreign Application Priority Data

Nov. 28, 2003 (JP) .............................. 2003-398425
Nov. 28, 2003 (JP) .............................. 2003-398426
Mar. 19, 2004 (JP) .............................. 2004-080984

(51) Int. Cl.
  *G06K 9/00* (2006.01)
  *G06K 9/34* (2006.01)
  *G06K 9/62* (2006.01)
  *G06K 9/68* (2006.01)

(52) U.S. Cl. ..................... 382/203; 382/162; 382/175; 382/209; 382/218; 382/219

(58) Field of Classification Search ................ 382/112, 382/162, 175, 176, 180, 203, 209, 217, 218, 382/219, 220, 224

See application file for complete search history.

(56) References Cited

U.S. PATENT DOCUMENTS 5,159,667 A * 10/1992 Borrey et al. ............... 715/205
5,502,575 A * 3/1996 Kai et al. .................... 358/405
5,835,634 A * 11/1998 Abrams ...................... 382/222
6,356,654 B1 * 3/2002 Loce et al. .................. 382/162
6,757,428 B1 * 6/2004 Lin et al. .................... 382/165

FOREIGN PATENT DOCUMENTS

| JP | 09-016714 A | 1/1997 |
|---|---|---|
| JP | 09-016714 A | 1/1997 |
| JP | 10-208040 A | 8/1998 |
| JP | 11-025214 A | 1/1999 |
| JP | 2000-285187 A | 10/2000 |
| JP | 2000-285190 A | 10/2000 |
| JP | 2000-285190 A | 10/2000 |
| JP | 2001-109842 A | 4/2001 |
| JP | 2003-316804 A | 11/2003 |

* cited by examiner

*Primary Examiner*—John B Strege
(74) *Attorney, Agent, or Firm*—Canon U.S.A. Inc., I.P. Division

(57) ABSTRACT

In document recognition processing for accurately recognition a document image at high speed, a shape feature is extracted from a component included in an input document image, and the degree of similarity of shape between the document image and the registered document is calculated based on the extracted shape feature. When it is determined that the component of the document image has color information, the color information is extracted from the document image, thus calculating the degree of similarity of color information from the document image. The degree of similarity of shape is corrected based on the degree of similarity of color information, thus determining that the registered document is similar to the document image.

10 Claims, 19 Drawing Sheets

FIG. 8

STORAGE MEDIUM

| DIRECTORY INFORMATION |
|---|
| 1$^{ST}$ DATA PROCESSING PROGRAM<br><br>PROGRAM CODE FOR STEPS IN FLOWCHART SHOWN IN FIG. 2 |
| 2$^{ND}$ DATA PROCESSING PROGRAM<br><br>PROGRAM CODE FOR STEPS IN FLOWCHART SHOWN IN FIG. 7 |
| |

FIG. 12A
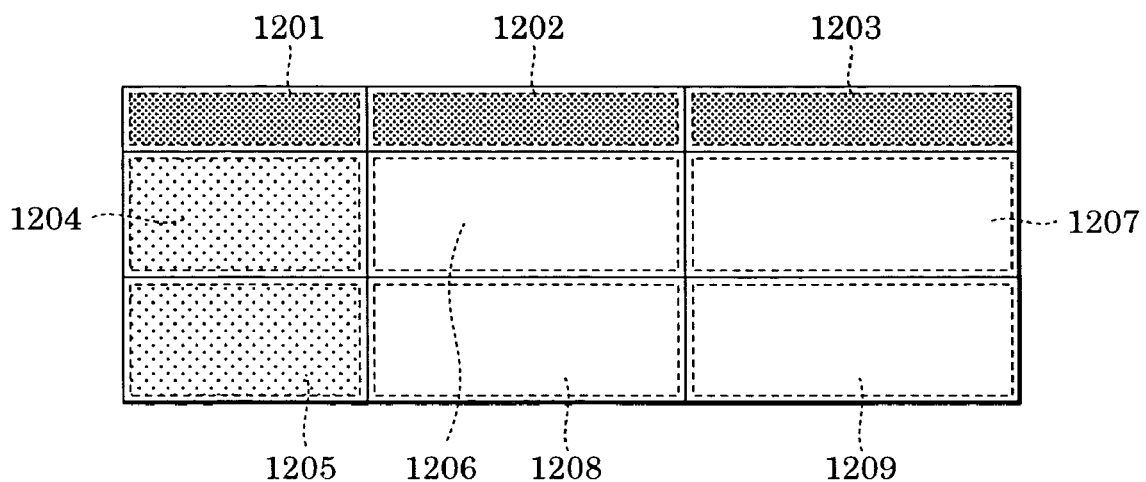
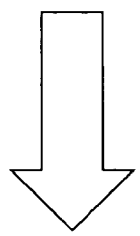
FIG. 12B
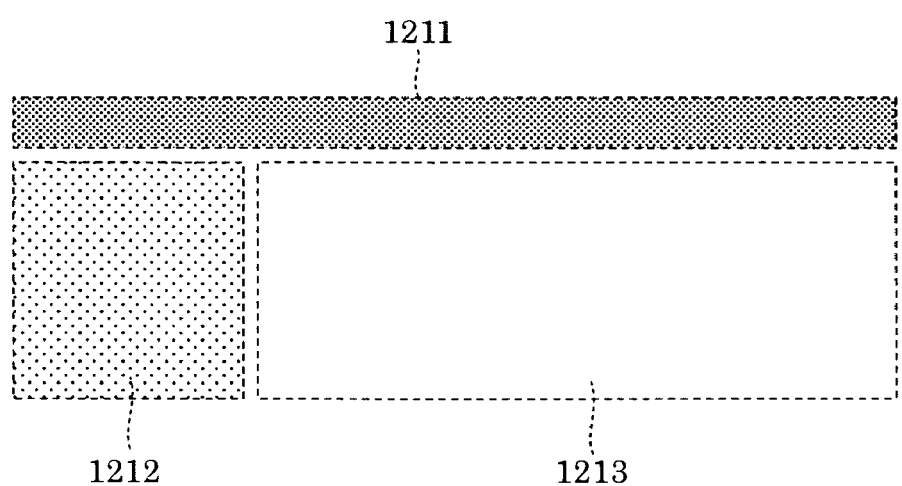

DOCUMENT RECOGNITION DEVICE, DOCUMENT RECOGNITION METHOD AND PROGRAM, AND STORAGE MEDIUM

BACKGROUND OF THE INVENTION

1. Field of the Invention

The present invention relates to a document recognition device which automatically recognizes documents, a document recognition method, and program, and a storage medium.

2. Description of the Related Art

It is advantageous to carry out processing to automatically recognize that an input document (or form) corresponds to one of a plurality of registered documents that were previously registered as templates.

In document recognition processing, features are extracted from data of a document image read by a scanner or the like, document data is generated, the degree of similarity between the input document and the registered document is obtained, and thus the registered document having the highest degree of similarity is recognized as the input document.

The following conventional document recognition methods are known.

According to Japanese Patent Laid-Open No. 2000-285187, tables in the document are focused on and the ratio of the area of each table to the total area of all tables is used as a degree of similarity that is visually recognized by a human. In this document recognition process, a higher degree of similarity is obtained for the document image having lines of similar shape, and the document is then identified from the registered documents by comparison with the degree of similarity.

However, in the document recognition process according to Japanese Patent Laid-Open No. 2000-285187, although shape features of a search document are approximately equal to those of the registered document, the document is not recognized when the colors of the document images, e.g., the color of lines, are different from each other. For example, when the original document contains color (not monochrome), a document copied by a monochrome copying machine is not recognized because the document does not have color information.

According to Japanese Patent Laid-Open No. 2001-109842, the document recognition process is performed by focusing on color information at a specific part of the document (color ID region having a document ID).

However, the document recognition process according to Japanese Patent Laid-Open No. 2001-109842 has a disadvantage in that the shape of the form is limited because the form must have the form ID region containing the form ID.

Further, according to Japanese Patent Laid-Open No. 2000-285190, a plurality of features are used as the features of the document image, that is, the document is not determined based on one feature, and then, document candidates are narrowed based on the features, and the document is thereafter recognized based on other features.

However, according to Japanese Patent Laid-Open No. 2000-285190, when the document is not determined based on the features used, the document candidates are sequentially narrowed using other features. Here, the disadvantage is that the recognition result is inconsistent and varies depending on the order of the features used for determination because the features are sequentially used.

Further, according to Japanese Patent Laid-Open No. 9-16714, a standard document is created and is registered based on the color range which is set by a user on a multi-color document image. Then, the type of document is determined by comparison with the input document.

However, the kind of color information used as a determining reference in the document recognition is limited because the document registration needs the designation of color range in advance.

SUMMARY OF THE INVENTION

The present invention is directed to a document recognition device and a document recognition method and program. Among other advantages, the document recognition system of the present invention allows document images to be recognized with high accuracy and at high speed.

Shape features of an input document image are extracted from a component included in the input document image and then the degree of similarity between the document image and the registered documents is calculated based on the extracted shape features. Further, color information is extracted from the component included in the document image and then the degree of similarity of color information is calculated. Then, the degree of similarity of shape is corrected based on the degree of similarity of color information, and it is determined that the registered document is similar to the document image.

A monochrome binary document and a color document are merged with a high recognition ratio according to the present invention.

Furthermore, the components in the document image having a similar color are merged and are then processed according to the present invention.

According to the present invention, both color information and format data on the position and shape of a region such as a table region or a character region can be simultaneously used and recognized. In the determination using the color information, an achromatic color with low luminance (e.g. black) has color component values that are much lower than those of a chromatic color with high luminance. Therefore, the achromatic color with low luminance increases the error rate of color information in the printing and scanning operation, as compared with that of the chromatic color with high luminance. Thus, the color classification causes a problem in that the achromatic color with low luminance is not determined as the same color by using the same allowable range as that of another color. Then, according to the present invention, the recognition of a color document using the color information prevents erroneous recognition due to the color information determination and thus improves the identification rate.

Further features, and advantages of the present invention will become apparent from the following description of the embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram of a memory map of a storage medium for storing various data processing programs according to the present invention;

FIGS. 12A and 12B are diagrams for explaining examples of the processing in step S1006 according to the fifth embodiment;

DETAILED DESCRIPTION OF THE EMBODIMENTS

First Embodiment

Figure 1:
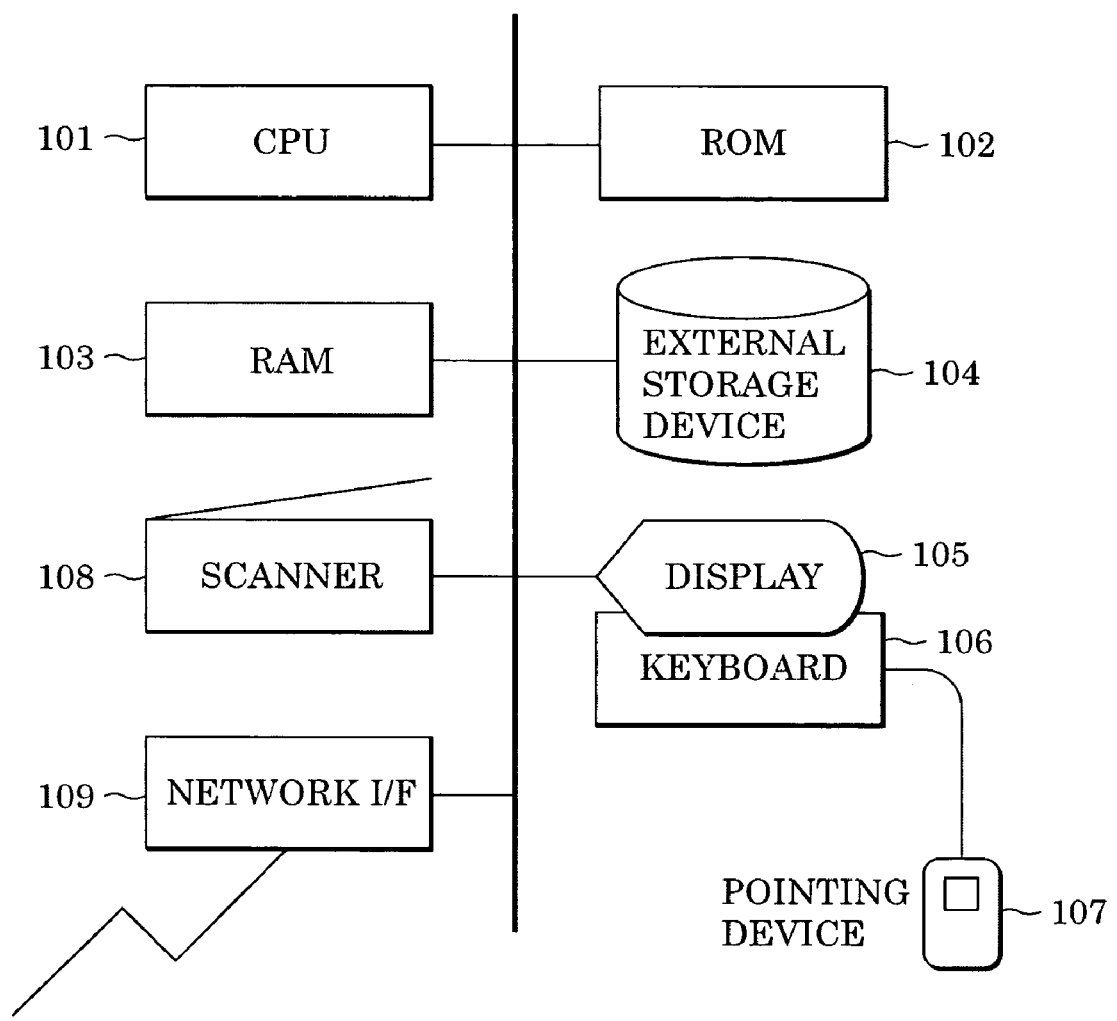
FIG. 1 is a block diagram showing a document recognition device according to the first embodiment of the present invention.

FIG. 1 is a block diagram showing a document recognition device according to the first embodiment of the present invention. Referring to FIG. 1, the document recognition device comprises: an external storage device 104 such as a magnetic disk; and an image scanner 108. Document image data is input by being read from the external storage device 104 or by directly reading an original by the image scanner 108. Further, the document recognition device comprises a CPU 101 for systematic control, and a control program of the CPU 101 is stored in a ROM 102. The image input from the image scanner 108 is stored in a RAM 103 and the control program in the ROM 102 executes the document recognition process. A recognition dictionary for recognizing the document is stored in the ROM 102 together with the control program, or is read from the external storage device 104 to the RAM 103 for each necessary dictionary.

Pre-processing such as noise reduction is executed before the document recognition process if necessary.

Referring to FIG. 1, reference numeral 105 denotes a display, reference numeral 106 denotes a keyboard, and reference numeral 107 denotes a pointing device such as a mouse.

Further, reference numeral 109 denotes a network interface (I/F) which communicates data with a device at a remote position (not shown) and which receives and sends the program, the recognition dictionary, and the data.

According to the present invention, the document recognition process is executed by a general-purpose computer. In this case, the control program provided by a medium may be stored in the external storage device 104 and may be executed by the CPU 101 in accordance with an instruction from an operator. Further, a computer program for executing the processing sequence according to the present invention may be executed via a network or the like.

Next, a description is given of a document recognition method which is executed by the document recognition device shown in FIG. 1 according to the first embodiment of the present invention with reference to the drawings.

Figure 2:
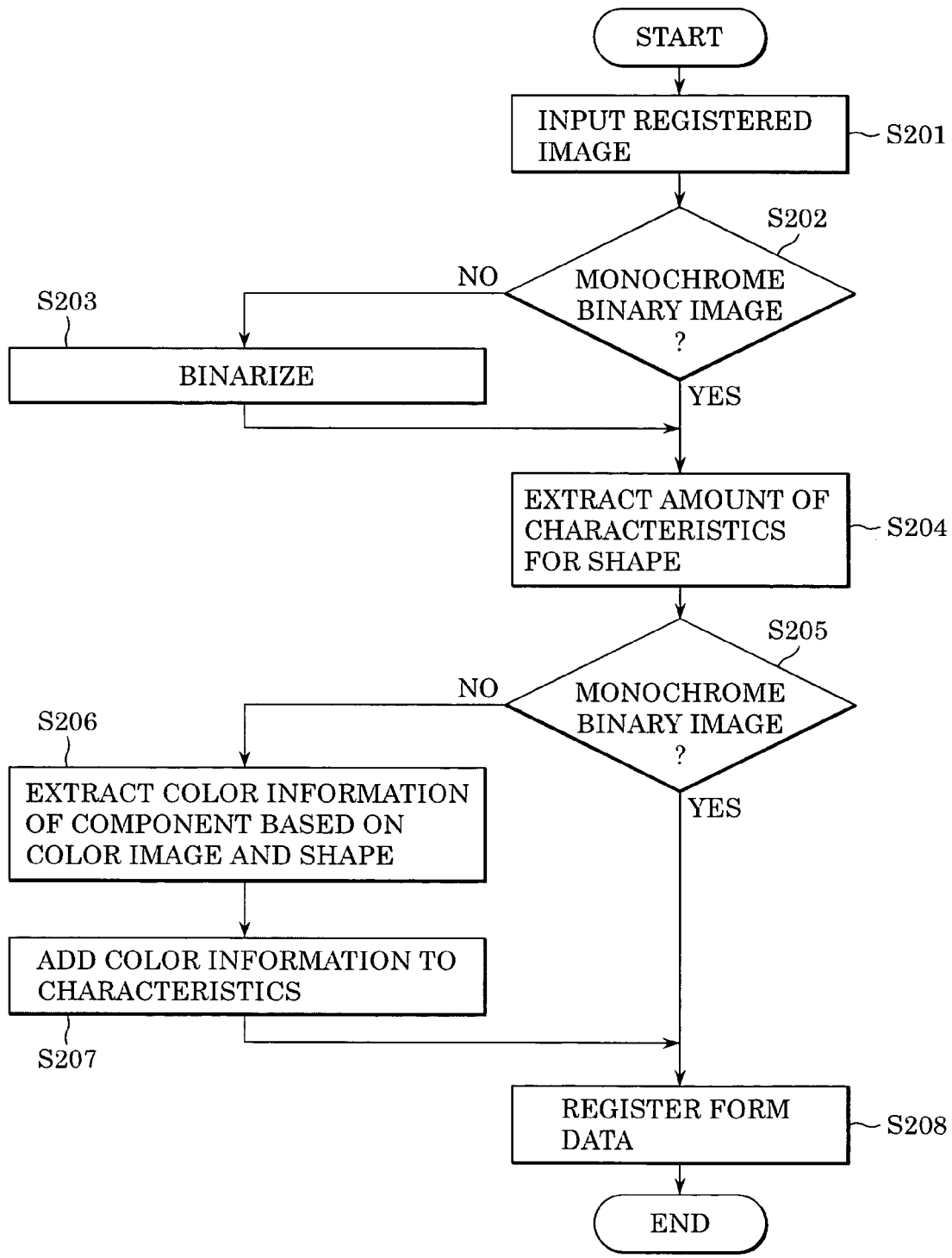
FIG. 2 is a flowchart for registration processing of the documents according to the first embodiment.

Referring to FIG. 2, the following steps execute the processing for registering the documents used as templates.

In step S201, the document image to be registered is input from the image scanner 108 or the like.

In step S202, it is determined whether the document image input in step S201 is a monochrome binary image. If YES in step S202, the processing advances to step S204. If NO in step S202, the processing advances to step S203. Note that if NO in step S202, the document image may include a color multi-value image, a color binary image, or a gray-scale (monochrome multi-valued) image.

In step S203, the color multi-valued image or another image is converted into a monochrome binary image and then the processing advances to step S204.

In step S204, shape features in the monochrome binary image are extracted. Shape features mean the size, position, number of components in the document (e.g., table frame or characters), and the number of cells. Then, the processing advances to step S205.

In step S205, it is determined again whether the original input document image is a monochrome binary image. If YES in step S205, the color information does not exist and then the processing advances to step S208. If NO in step S205, the processing advances to step S206.

In step S206, the color information for the components extracted in step S204 is extracted from the original input document image (color multi-valued image or another image) (e.g., it is determined, by 8 bits (256 gradations) of red (R), green (G), and blue (B), which value is included in the original input document image). Then, the processing advances to step S207.

In step S207, the color information extracted in step S206 is added, as characteristics, to shape features extracted in step S204.

In step S208, shape features obtained in step S204 and the features for color information obtained in step S207 are registered as document data of the registered document.

The document data of the registered document is added to the recognition dictionary as a result of the above-mentioned document registration process, and is used as template.

A detailed description is given of the extraction of the features of color information in step S206 in the processing shown in FIG. 2 with reference to FIGS. 3 to 6.

Figure 3:
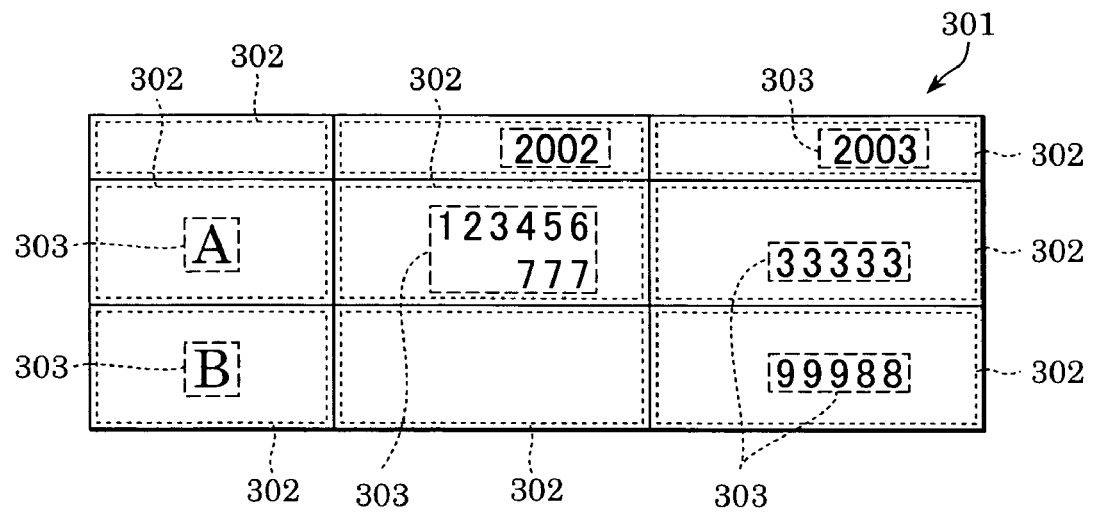
FIG. 3 is a diagram showing one example of a table frame included in a document image.

FIG. 3 is a diagram showing one example of a table frame included in a document image. Referring to FIG. 3, the total number of cells in the table is nine, and including three rows and three columns, and includes a frame line (line) 301, and characters and the like are contained in the cells if necessary. In FIG. 3, the cell at the first row and first column does not include any characters, the cell at the first row and the second column includes characters "2002", the cell at the first row and the third column includes characters "2003", the cell at the second row and the first column includes the character "A", the cell at the second row and the second column includes two character strings "123456" and "777", the cell at the second row and the third column includes the characters "33333", the cell at the third row and the first column includes the character "B", the cell at the third row and the second column does not include any characters, and the cell at the third row and the third column includes the characters "99988". In the example shown in FIG. 3, the characters are contained in the seven cells. A rectangle 302, which is drawn from an experiment, shows the region of a cell, and a dotted line 303 denotes a rectangular character region.

According to the first embodiment, the color information extraction process in step S205 includes cell region color-information extraction processing (FIG. 4) for extracting the color information of the cell region in the table forming the document image, character region color-information extraction processing (FIG. 5) for extracting the color information of the character region in the cell region, and line color-information extraction processing for extracting the color information of the lines forming the table.

Figure 4:
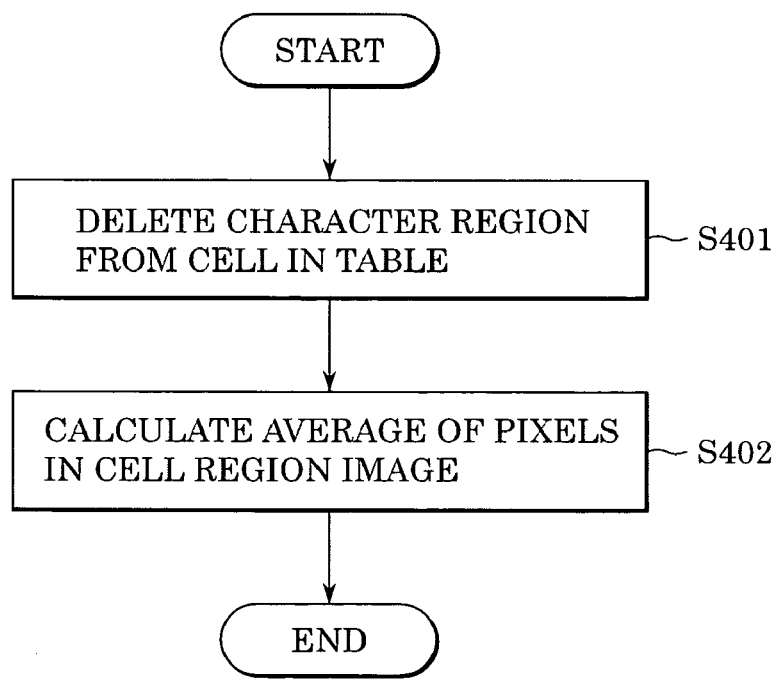
FIG. 4 is a flowchart for background-color information extraction processing in a cell.

Referring to FIG. 4, the following steps execute the extraction of color information in the cell in the table shown in FIG. 3.

In step S401, the character regions in the table, namely, the character regions (dotted rectangular regions) at the first row and the second column, the first row and the third column, the second row and the first column, the second row and the second column, the second row and the third column, the third row and the first column, and the third row and the third column, are removed from the input image, which is not the registered document.

In step S402, the average of the color information of the cell is calculated based on the cell regions from which the character regions are removed in step S401, and the obtained average is set as cell background color information (cell color).

As mentioned above, the color information of the cells in the cell regions in the table is obtained.

Figure 5:
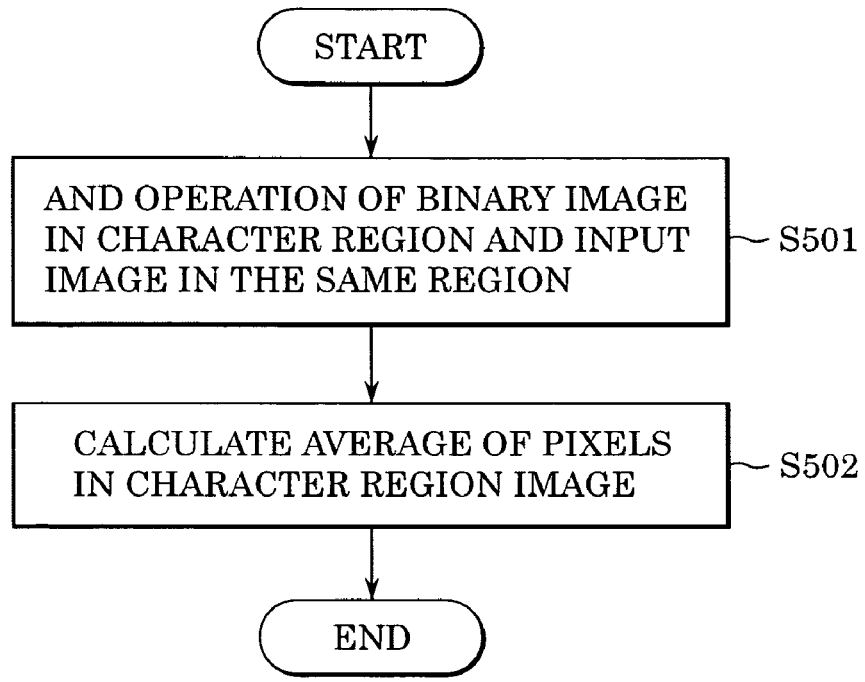
FIG. 5 is a flowchart for character color extraction processing in the cell.

Referring to FIG. 5, the following steps execute the character color extraction process in the table in FIG. 3.

In step S501, a binary image is generated for the rectangular character region in the cell in the table in FIG. 3, by a binary threshold for setting the pixels of the character as "1" and the pixels of the background as "0", and an AND operation of the binary image and the original color image is executed. Thus, no more than the pixels of the character are extracted from the original color image.

In step S502, for the color pixels of the character extracted in step S501, the average of the color information is calculated in the rectangular character region, and the obtained average is set as the color information of the character color.

Figure 6:
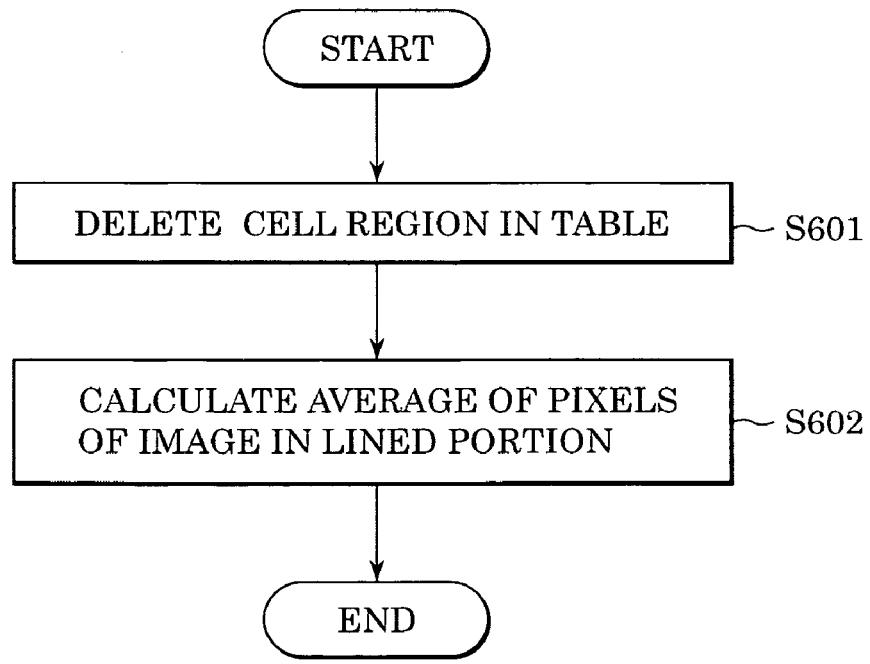
FIG. 6 is a flowchart for line-color extraction processing.

Referring to FIG. 6, the following steps execute the line-color extraction process in the frame shown in FIG. 3.

In step S601, all cell regions (including the character region) in the table shown in FIG. 3 are removed and a color image of only the lines is generated.

In step S602, the average of the remaining pixels at the line portions in step S601 is set as the color information of the line color.

As mentioned above, the color information extracted in step S206 includes the color information (background color information, character color information, and line color information extracted in FIGS. 4 to 6).

Figure 7:
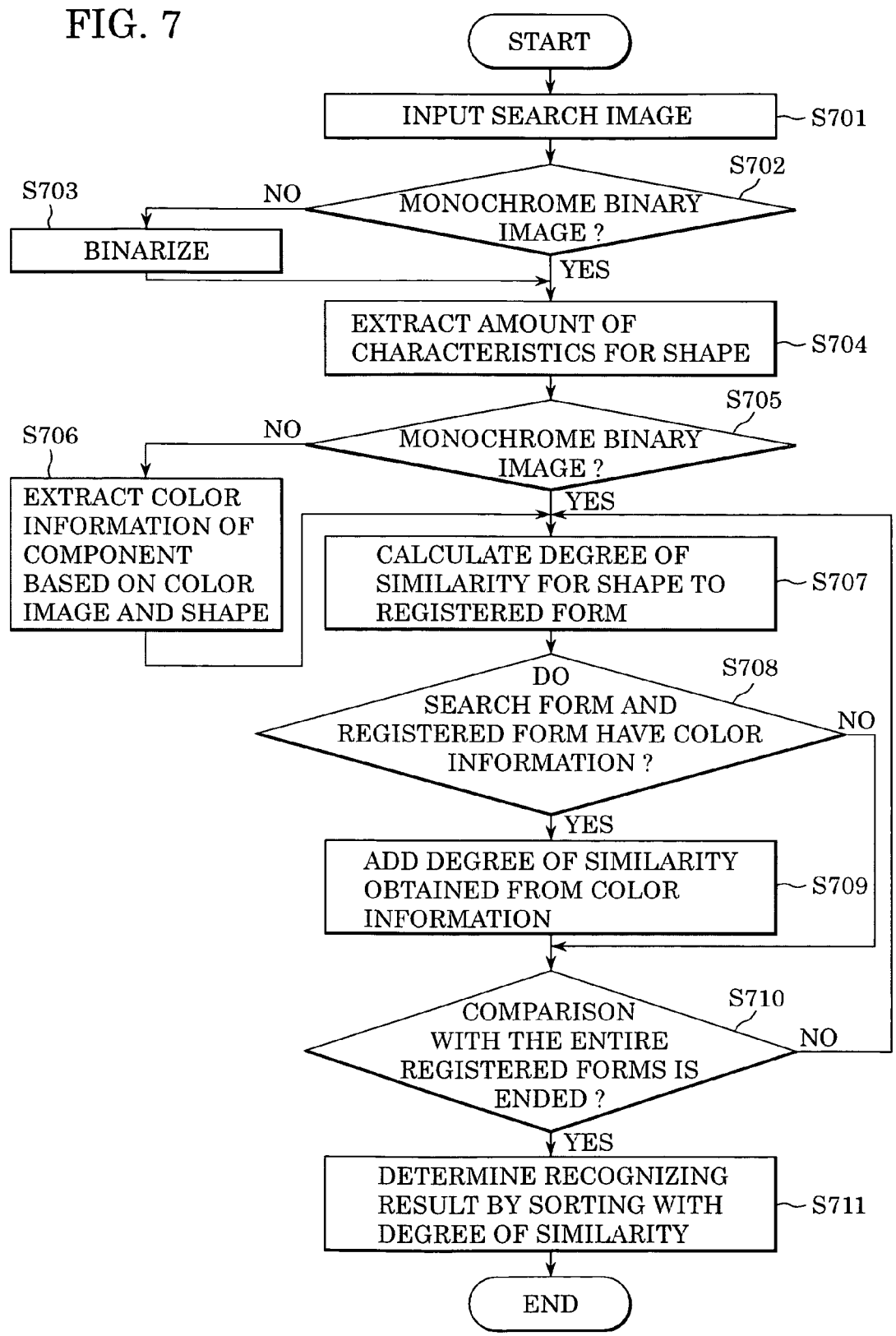
FIG. 7 is a flowchart for document recognition processing according to the first embodiment.

The recognition processing for extracting the registered document having a degree of similarity to the input document is executed by the steps shown in FIG. 7 by using the recognition dictionary comprising the document data registered by the processing shown in FIG. 2.

In step S701, similar to step S201 in FIG. 2, the document image (search document) serving as the recognition target is input from the image scanner 108 or the like.

In step S702, similar to step S202 in FIG. 2, it is determined whether the document image (search document) input in step S701 is a monochrome binary image. If YES in step S702, the processing advances to step S704. If NO in step S702, the processing advances to step S703.

In step S703, similar to step S203 in FIG. 2, the image of the search document is converted into a monochrome binary image, and then the processing advances to step S704.

In step S704, similar to step S204 in FIG. 2, shape features are extracted based on the monochrome binary image.

In step S705, similar to step S205 in FIG. 2, it is determined again whether the original image of the input document (search document) is a monochrome binary image. If YES in step S705, the processing advances to step S707. If NO in step S705, the processing advances to step S706.

In step S706, similar to step S206 in FIG. 2, the color information is extracted for the component extracted in step S704 in the original color image. Then, the processing advances to step S707.

In step S707, the degree of similarity is calculated between the search document and one registered document in the recognition dictionary by using shape features.

In step S708, it is determined whether the search document and the registered document serving as the estimation target in step S707 are color documents. If the search document and the registered document are color documents, the processing advances to step S709. If any of the search document and the registered document is not color documents, the processing jumps to step S710. According to the first embodiment, a monochrome multi-valued image is used as the color document.

In step S709, the color information for the corresponding components, such as the corresponding cell, corresponding lines, and corresponding characters, of the table is compared between the search document and the registered document set as the estimation target in step S707. If the color information for the registered document matches the color information for the search document, the degree of similarity is corrected by adding a predetermined value to the degree of similarity obtained in step S707.

In the determination as to whether the color of the search document is the same as that of the registered document (color information matching), it is determined that R, G, and B color components are within predetermined allowable ranges and then the color information of the search document matches that of the registered document. This is the reason why variation may be caused in the colors due to the printing of the document image and in the color detecting accuracy due to the scanner.

The best value for degree of similarity Sc to be added is obtained by experiment. For the maximum value of the degree of similarity Sf for shape, a predetermined ratio r (e.g., 20%) is the upper limit. The degree of similarity (Sc=rkSf/K) to be added is obtained by a ratio (k/K) of k components having the same color to K components as the comparison targets of color information.

For example, when the number K of components is 9, the number k of components having the same color is 2, and r=0.2, a value [Sc=(0.2*2/9)*Sf=0.044*Sf] is added to the degree of similarity Sf for shape.

For the color information, the likelihood is added to the estimation of the components having the same color. The added value may be changed depending on the color matching for cells, lines, or characters.

In step S710, after step S709, it is determined whether the calculation of the degree of similarity between the search document and all registered documents is completed. If YES in step S710, the processing advances to step S711. If NO in step S710, the processing returns to step S707 and then the degree of similarity is calculated for the next registered document.

In step S711, the degrees of similarity calculated in step S707 or S709 are sorted and the registered document having the highest degree of similarity is set as the document recognition result.

When the highest degree of similarity does not reach the predetermined threshold, it is determined that a registered document similar to the search document does not exist. This result is then reported.

As mentioned above according to the first embodiment, for a document without color information, the degree of similarity is calculated using only the shape features. For a document with color information, the result determined for the color information is added to the degree of similarity. As a consequence, a color document and a monochrome binary document are simultaneously recognized and a color document is recognized with higher accuracy.

Under an environment where only a monochrome binary document is recognized, a color document is easily recognized.

Referring to FIG. 8, a memory map of the storage medium for storing various data processing programs executed by the document recognition device shown in FIG. 1 includes: a region for storing directory information; a region for storing program code corresponding to steps in the flowchart shown in FIG. 2; and a region for storing program code corresponding to steps in the flowchart shown in FIG. 7.

Although not shown, the data according to the various programs, e.g., recognition dictionary, is managed in the region for the directory information, and a program for installing the various programs into a computer is stored in the storage medium.

Second Embodiment

Figure 9:
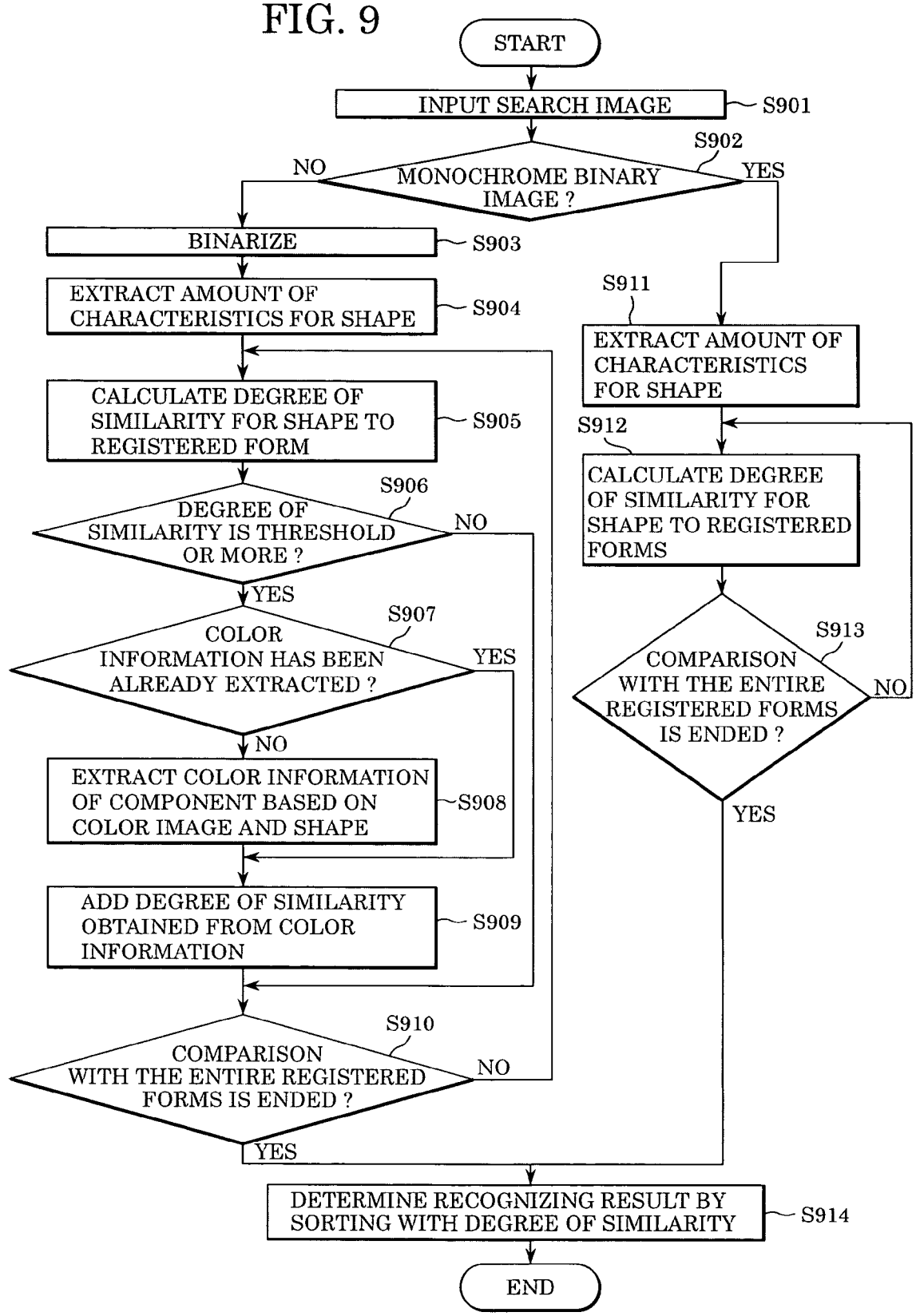
FIG. 9 is a flowchart for document recognition processing according to the second embodiment.

A description is given of a document recognition method which is executed by the document recognition device shown in FIG. 1 according to the second embodiment with reference to the drawings. FIG. 9 is a flowchart showing the recognition processing in the document recognition method embodied by the document recognition device shown in FIG. 1 according to the second embodiment.

According to the second embodiment, the estimation of degree of similarity of color information is omitted for the registered document having low degree of similarity of shape.

Referring to FIG. 9, the recognition processing according to the second embodiment is executed by the following steps.

In step S901, similar to step S701 in FIG. 7, the image of the search document is input from the image scanner 108 or the like.

In step S902, similar to step S702 in FIG. 7, it is determined whether the document image input in step S701 is the monochrome binary image. If YES in step S902, the processing advances to step S911. If NO in step S902, the processing advances to step S903.

In step S903, similar to step S703 in FIG. 7, the image except for the monochrome binary image is converted into the monochrome binary image and then the processing advances to step S904.

In step S904, similar to step S704 in FIG. 7, shape features are extracted based on the monochrome binary image.

In step S905, similar to step 707 in FIG. 7, the degree of similarity is calculated by using shape features between the search document and one registered document in the recognition dictionary.

In step S906, it is determined whether the degree of similarity calculated in step S905 is a predetermined threshold or more. If YES in step S906, the processing advances to step S907. If NO in step S906, the processing jumps to step S910. Thus, the estimation of color information is omitted for the registered document having low degree of similarity of shape.

According to the first embodiment, when both the search document and the registered document include the color information, the degree of similarity of color information is added. However, the corresponding component in the different documents does not exist and therefore, in many cases, the estimation of color information of the corresponding component is unnecessary. According to the second embodiment, the estimation for color information is omitted for the registered document having the low degree of similarity and therefore the processing speed is improved without deterioration in recognition accuracy.

In step S907, it is determined whether the color information of the search document has already been extracted. If NO in step S907, the processing advances to step S908. If YES in step S907, the processing jumps to step S909.

In step S908, the color information of the search document is extracted and then the processing advances to step S909.

In step S909, similar to step S709 in FIG. 7, the color information extracted in step S908 is used and the color information of the corresponding components is compared between the search document and the registered document which is estimated in step S905. If the colors match each other, a predetermined value is added to the degree of similarity obtained in step S905.

In step S910, similar to step S710 in FIG. 7, after step S909, it is determined whether the calculation of degree of similarity is completed between the search document and the entire registered documents. If YES in step S910, the processing advances to step S914. If NO in step S910, the processing returns to step S906.

In step S911, when it is determined in step S902 that the image is the monochrome binary image, similar to step S904, shape features are extracted for the search document and then the processing advances to step S911.

In step S912, similar to step S905, the degree of similarity is calculated between the search document and one registered document in the recognition dictionary by using shape features.

In step S913, similar to step S910, subsequently to step S912, it is determined whether the calculation of degree of similarity is completed between the search document and the entire registered documents. If YES in step S913, the processing advances to step S914. If NO in step S913, the processing returns to step S912.

In step S914, the degrees of similarity calculated in steps S905, S909 and S912 are sorted and the registered document having the highest degree of similarity is set as the document recognition result.

As mentioned above, the processing using the color information is not performed for the registered document having low degree of similarity for shape features according to the second embodiment. Advantageously, the amount of calculation is reduced.

Third Embodiment

According to the third embodiment, when the image of the search document is gray scale (monochrome multi-value) and the image of the registered document (comparison target) is color, the image of the registered document is converted into gray scale and the degree of similarity of color information is calculated.

In addition to the above-mentioned method for converting the image into the gray scale, obtaining the degree of similarity, and adding the degree of similarity, the degrees of similarity for color components of R, G, and B and the degree of similarity for luminance are obtained and a value determined based on the degree of similarity for the obtained color components. The degree of similarity for luminance may also be added.

A monochrome copy image search button may be available on the operating screen according to the present invention. When the button is turned on, the default image of the search document is a gray-scale (monochrome multi-value) image. Then, if the image of the registered document is color, the image may be converted into gray scale and the degree of similarity of color information may be calculated.

As a consequence, when a document copied by a monochrome copying machine is scanned, the converted image of the color document can be searched to yield high degree of similarity.

Fourth Embodiment

Although the processing is changed depending on the determination (in steps S202, S205, S702, S705, and S902) of whether the image is the monochrome binary image or another image (color binary image, color multi-value image, or monochrome multi-value image) according to the first and second embodiments, the processing may be changed depending on the determination as to whether the image is any of the monochrome (binary or multi-value) and the color (binary or multi-value).

For example, a search button for images copied on other machines may be provided on the operating screen. When the button is turned on, the processing is changed depending on the determination as to whether the image is monochrome (binary or multi-value) or color (binary or multi-value). Thus, upon scanning the document copied by a monochrome copying machine having the algorithm for color/monochrome converting processing different from that in the present system and searching for the scanned document, the degree of similarity is calculated based on the shape without the color information. This allows highly accurate results to be obtained.

Fifth Embodiment

The structure of the document recognition device according to the fifth embodiment is similar to that of FIG. 1.

Figure 10:
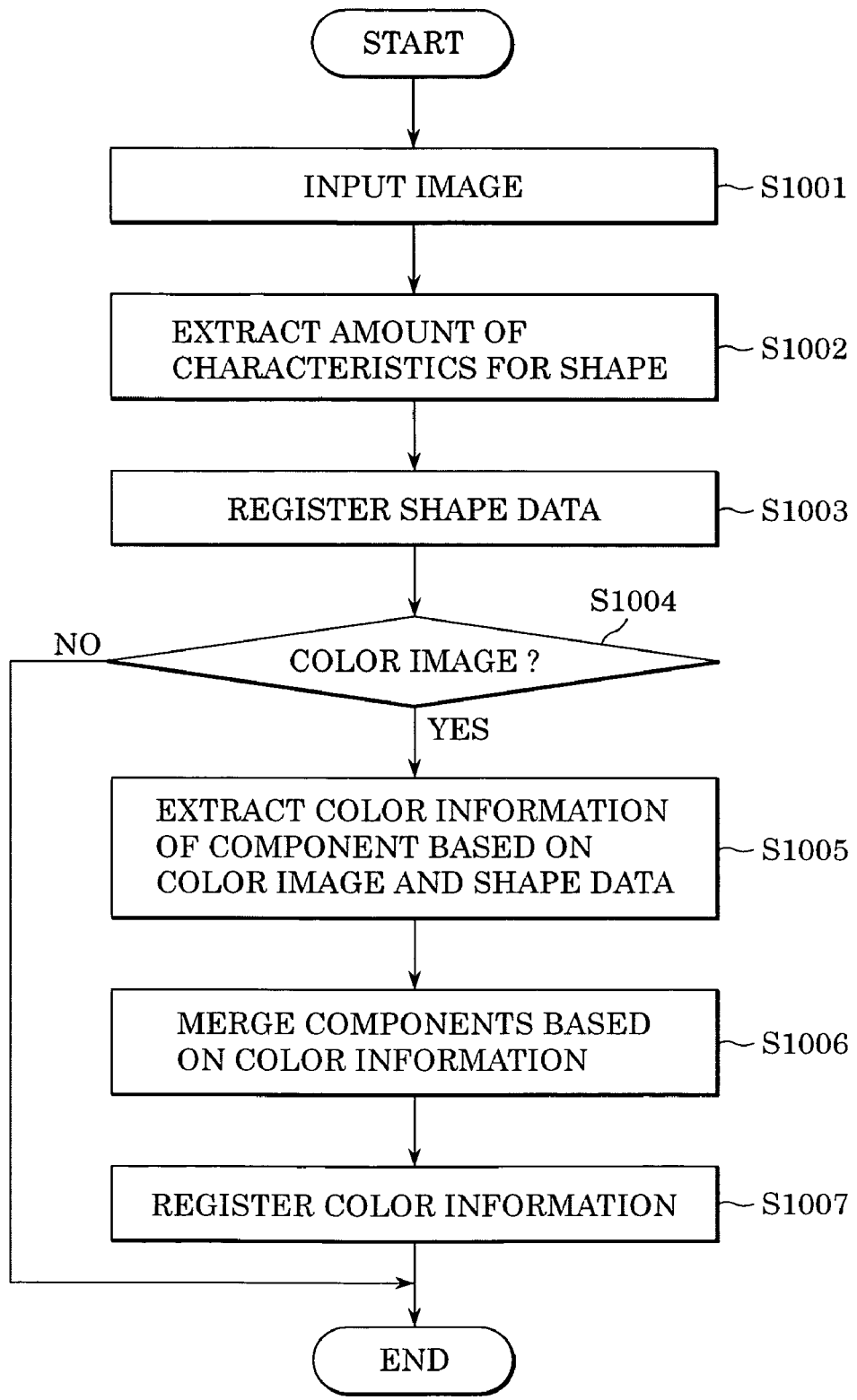
FIG. 10 is a flowchart for document registration processing according to the fifth embodiment.

First, a description is provided in FIG. 10 of the document registration process for registering the document used as a template.

FIG. 10 is a flowchart showing the document registration process in the document recognition device according to the fifth embodiment of the present invention.

In step S1001, an image (e.g., document image) as the registering target is input from the scanner 108. In step S1002, shape features are extracted for the shape of input image. Note that shape features may include the size, position, and number of tables in the document image or information on the components forming the document image such as the cell region in the table. The shape features are extracted by the processing in steps S202 to S204 in FIG. 2.

In step S1003, shape data is the shape (component) of the input image which is specified by the extracted features for shape, with a corresponding relation to the input image, and is stored in the external storage device 104.

In step S1004, it is determined whether the input image is color. If NO in step S1004, the processing ends. If YES in step S1004, the processing advances to step S1005.

In step S1005, the color information for the component of the input image is extracted based on the original color image as the input image and the shape data registered in step S1003.

Color information includes but is not limited to colors expressed by R, G, B levels. In addition, luminance information and density information may be extracted as color information.

In step S1006, among the components of the input image, the components adjacent thereto having the same color information are merged, to generate one merged component.

In step S1007, the color information of the merged component and the color information of a non-merged component are set as data on the color information, with a corresponding relation to the input image, and are registered in the external storage device 104. In this case, the shape data after merging the components is registered. Preferably, for the merged components, the shape data before merging is deleted and the color information and the shape data after merging are registered. Then, the amount of shape data is reduced.

The above-mentioned processing registers the input image and the corresponding shape data with at least a corresponding relation between the input image and the shape data in the external storage device 104. Further, when the input image is the color image, the shape data and the color information data are registered with the corresponding relation to the input image.

The processing for extracting the color information from the table in step S1005 is similar to that described with reference to FIGS. 3 to 6.

Figure 11:
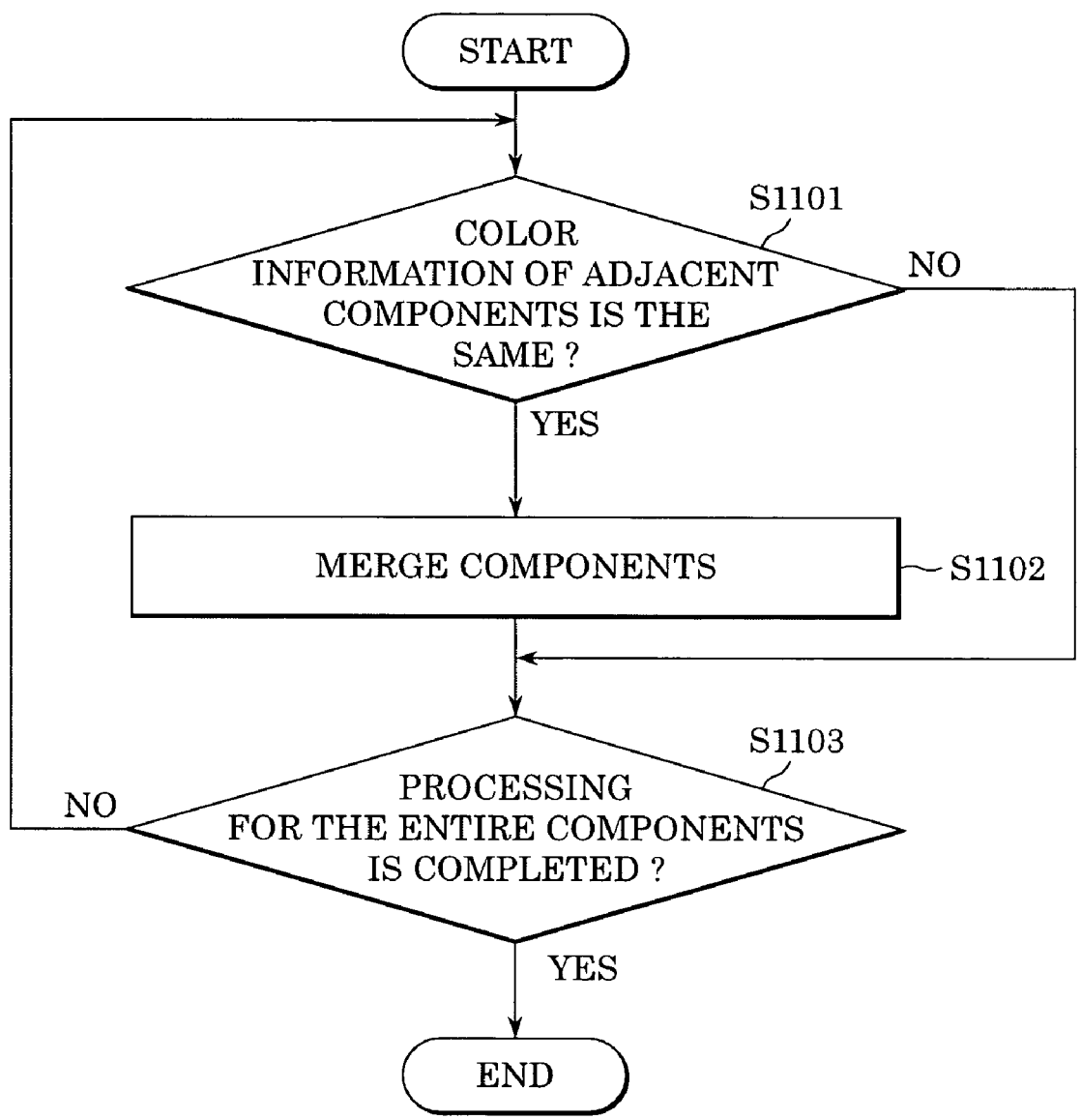
FIG. 11 is a flowchart for detailed merge processing in step S1006 according to the fifth embodiment.

Next, a detailed description of the processing in step S1006 is provided with reference to FIG. 11.

FIG. 11 is a flowchart showing the detailed processing in step S1006 according to the fifth embodiment.

In step S1101, the component as the processing target is selected. Then, it is determined whether the color information of the component adjacent thereto is the same. If NO in step S1101, the processing advances to step S1103. If YES in step S1103, the processing advances to step S1102.

In step S1102, the component as the processing target and the component as the determining target (namely, components adjacent to that as the processing target) are merged. The component is any of the cell region, character region, and line table and the like. In step S1101, the color information is compared for each of the components.

The possibility of the same color information is low due to the error in the printing or scanning operation. For the comparison of color information, the allowable range is set and if the difference between the color information is within the allowable range, the same color information is determined.

In step S1103, it is determined whether the processing in step S1101 is completed for the entire components in the image. If NO in step S1103, the processing returns to step S1101 whereupon the component which is not processed is selected and the processing in steps S1101 to S1103 is repeated until the processing ends for the entire components. If YES in step S1103, the processing ends.

Here, a description of an example of the processing in step S1006 in FIG. 10 and the merging process described in FIG. 11 is provided with reference to FIGS. 12A and 12B.

FIG. 12A is one example of a table image including cell regions 1201 to 1209 before the merging process of step S1006. The cell regions 1201 to 1203, cell regions 1204 and 1205, and cell regions 1206 to 1209 have the same color and are adjacent thereto, respectively.

The image shown in FIG. 12A is subjected to the merging process in step S1006 and then the example in FIG. 12B is obtained. Referring to FIG. 12B, the cell regions are merged, thereby generating the cell regions 1211, 1212, and 1213.

Figure 13:
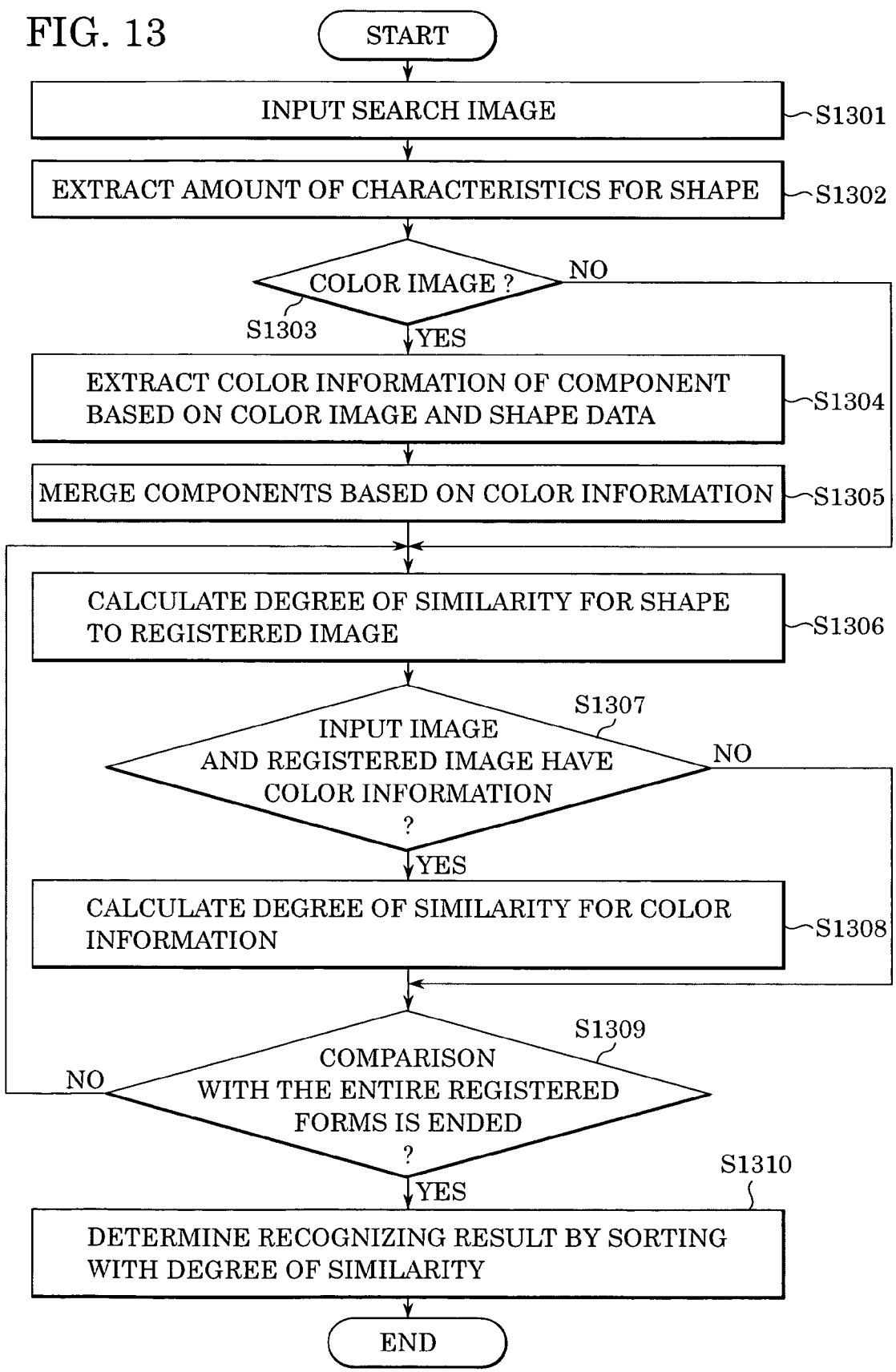
FIG. 13 is a flowchart for document recognition processing according to the fifth embodiment.

Next, a description of the search process (document recognition process) is provided with reference to FIG. 13. The search process searches the registered images (a plurality of registered documents) for the image corresponding to the search target.

FIG. 13 is a flowchart showing the document search process according to the fifth embodiment.

In step 1301, the image as the search target (e.g., document image) is input from the scanner 108. In step S1302, features for shape is extracted based on the shape of the component included in the input image (search document). The extraction of features for shape is similar to that shown in step S1002 in FIG. 10. The extracted features for shape is temporarily stored in the RAM 103 as the shape data of the input image.

In step S1303, it is determined whether the input image is the color image. If NO in step S1303, the processing advances to step S1306. If YES in step S1303, the processing advances to step S1304.

In step S1304, the color information of the component of the input image is extracted based on the color image as the input image and the shape data temporarily-stored in the RAM 103. In step S1305, the components of the input image adjacent thereto, with the same color information, are merged, thereby generating the merged component.

In step S1306, the shape data is compared between the input image (search document) and the registered image (registered document) as the comparison target, thereby calculating the degree of similarity (first degree of similarity) based on the shape data. In step S1307, it is determined whether both the input image and the registered image as the comparison target have color information. If NO in step S1307, the processing advances to step S1309. If YES in step S1307, the processing advances to step S1308.

Note that when any of the input image and the registered image is the binary image or both of them are the binary images in the determination in step S1307, the processing advances to step S1309.

In step S1308, the color information for the component of the input image is compared with the color information for the component of the registered image as the comparison target, thereby calculating the degree of similarity (second degree of similarity) based on the color information. In particular, the calculated second degree of similarity is added to the first degree of similarity calculated in step S1306.

The calculation and addition of the second degree of similarity in step S1308 may be executed only when the color information is the same.

The chance that the color information of the input image is the same as that of the registered image as the comparing target is low due to the printing status of the input image and the reading condition of the scanner. Therefore, the color information may have a certain error range and it may be determined whether the color information is the same within the error range.

For the second degree of similarity, the best value is calculated by experiment. For example, the maximum value of the second degree of similarity is 0.2 times the maximum value of the first degree of similarity, and the value obtained by multiplying the ratio of the matching color between the components as the processing target is set as the second degree of similarity (addition value) which is added to the first degree of similarity. The addition value may be weighted with the calculated degree of similarity, depending on the type of the cell region, character region, and line as the components.

In step S1309, it is determined whether comparison with all of the registered images has ended. If NO in step S1309, the processing returns to step S1306 whereupon the degree of similarity to the next registered document is calculated. If YES in step S1309, the processing advances to step S1310.

In step S1310, the degrees of similarity calculated for the registered images are sorted, and the registered image having the maximum degree of similarity is determined as a recognition result corresponding to the input image.

When the maximum degree of similarity does not reach the predetermined one, it is determined that the registered image corresponding to the input image does not exist. Then, such a result is output. Alternatively, the three registered images starting from that having the maximum degree of similarity may be output as candidates of the recognition results corresponding to the input image and may be finally selected by the operator. It is noted that although final selection is typically by the operator, automatic selection without operator input is contemplated.

As mentioned above, according to the fifth embodiment, during the registration process, the color information is extracted for every component of the input image as the processing target, the extracted color information is the same as that adjacent thereto, and then, the components are merged and are registered. Thus, the amount of information on the registered image can be reduced.

In the search process (recognition processing) in which the image corresponding to the input image is searched from the registered images, not only shape features of the input image but also the degree of similarity of color information of the registered image is calculated, thereby precisely searching for (recognition) the image.

In the calculation of degree of similarity, the components whose color information is the same are merged and then the degree of similarity is calculated. Thus, the number of comparing and calculating times is reduced in the calculation of degree of similarity.

Sixth Embodiment

In the search process according to the fifth embodiment, the degrees of similarity for color information are calculated between the input image and the entire registered images. When the shape of registered image as the comparison target is not similar to that of the input image, the chance that the color information is not similar thereto or the common component does not exist is high. Thus, even if the degree of similarity of color information between the input image and the registered image is calculated, the degree of similarity of color information of the input image is not similar to that of the registered images and the chance that the registered image is not finally obtained corresponding to the input image is low.

As a consequence, the calculation of degree of similarity of color information is redundant.

Then, according to the sixth embodiment, when the degree of similarity of shape of the input image and the registered image as the comparison target is not less than a threshold, the calculation of degree of similarity is omitted such that the redundancy of processing is reduced, and the processing speed and precision are improved.

Hereinbelow, a description of the document search process according to the sixth embodiment is provided with reference to the flowchart of FIG. 14.

Figure 14:
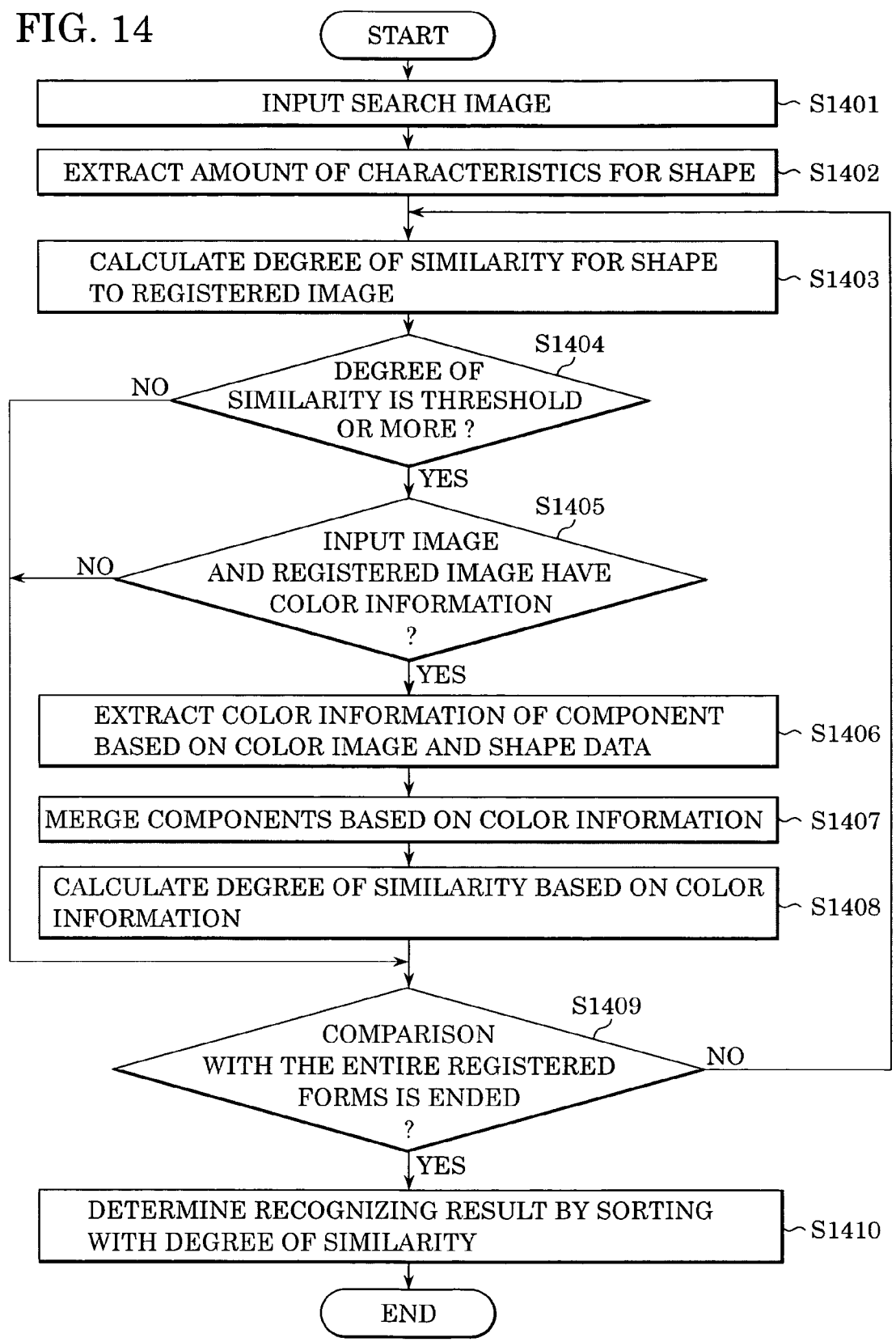
FIG. 14 is a flowchart for document recognition processing according to the sixth embodiment.

Referring to FIG. 14, steps S1401 and S1402 and steps S1408 to S1410 correspond to steps S1301 and S1302 and steps S1308 to S1310 in FIG. 13 and therefore a description thereof is omitted.

After steps S1401 and step S1402, in step S1403, the first degree of similarity based on the shape data is calculated between the input image and the registered image as the comparison target.

In step S1404, it is determined whether the first degree of similarity is the threshold or more. If NO in step S1404, it is determined that the registered image as the comparison target is not the registered image corresponding to the input image. In order to select the next registered image as the comparison target, the processing advances to step S1409. If YES in step S1404, the processing advances to step S1405.

In step S1405, it is determined whether both the input image and the registered image as the comparison target have the color information. If NO in step S1405, the processing advances to step S1409. If YES in step S1405, the processing advances to step S1406.

In step S1406, the color information for component of the input image is extracted based on the color image as the input image and the shape data temporarily-stored in the RAM. In step S1407, the components of the image input, which are adjacent thereto and have the same color information are merged, thereby generating one merged component.

Then, the processing in steps S1408 to S1410 is executed. Note that in step S1010 according to the second embodiment, only the registered image whose second degree of similarity is calculated is processed. Thus, the search accuracy of the registered image similar to the input image can be improved.

As mentioned above, in addition to the advantages according to the fifth embodiment, the processing, can be omitted, for calculating the degree of similarity based on the degree of similarity for the registered image having the low chance that it becomes the candidate of input image according to the sixth embodiment. Further, according to the sixth embodiment, the processing load of system is reduced and the processing speed is improved.

Seventh Embodiment

Figure 15:
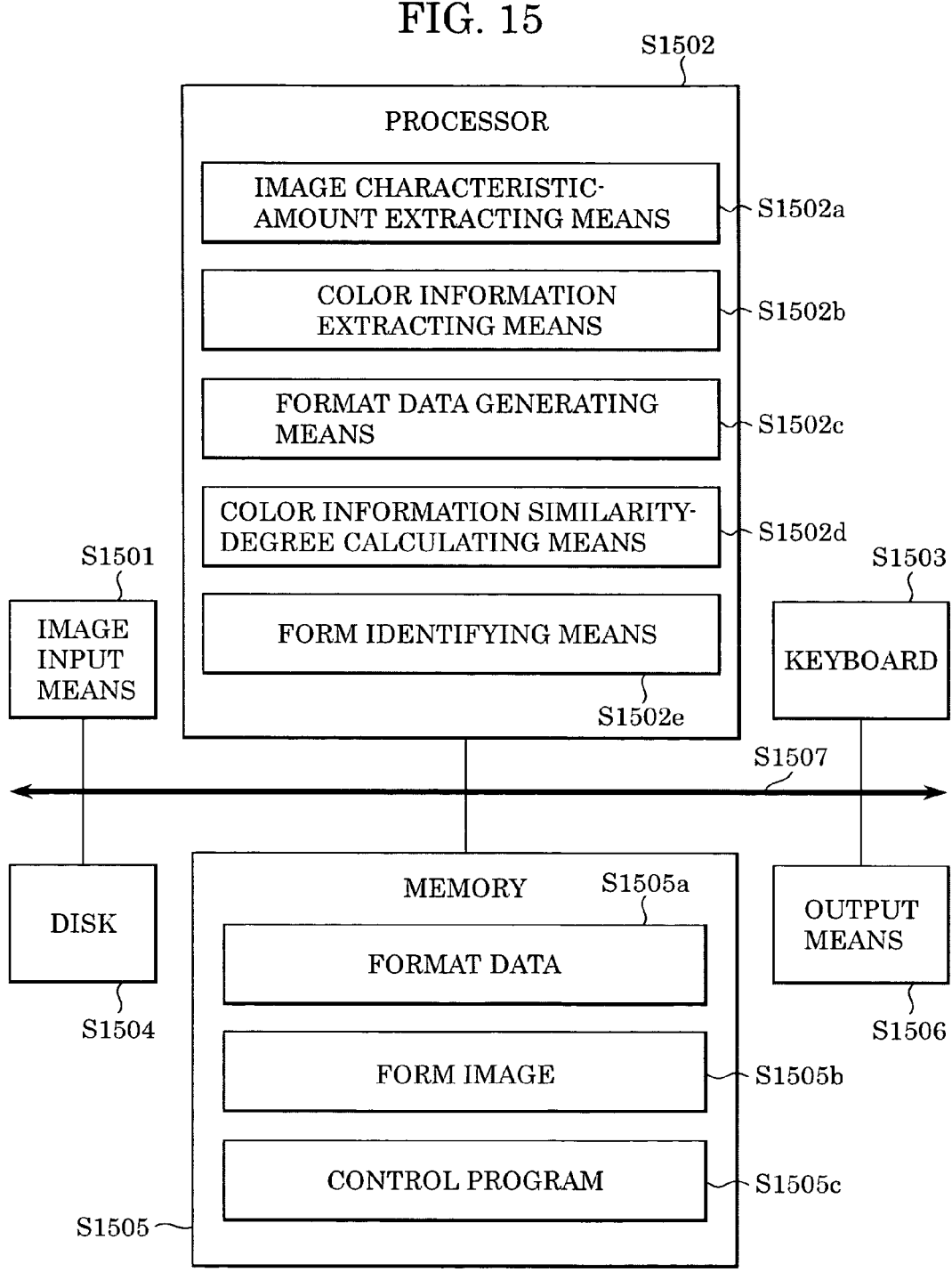
FIG. 15 is a block diagram showing a document recognition device according to the seventh embodiment.

FIG. 15 is a block diagram showing a document recognition device according to the seventh embodiment.

Referring to FIG. 15, the document recognition device comprises image input means 1501 such as a scanner, camera, or file reading device, and inputs, as image data, the search document as the recognition target from the image input means 1501.

The image input means 1501 is connected to a bus 1507 and is further connected to a processor 1502, thereby executing the document recognition via the bus 1507.

Further, connected to the bus 1507 are a keyboard 1503, a disk 1504, a memory 1505, and output means 1506.

The memory 1505 temporarily stores the data upon creating processing control information in the processor 1502 or stores the document image read by the image input means 1501. Format data of the registered document is read from the disk 1504 or the like and is stored. A control program 1505c is stored in the memory 1505 to enable a computer to execute processing corresponding to a flowchart, which will be described later. The control program according to the seventh embodiment may be read via the network or may be executed by the computer.

The processor 1502 executes the control program 1505c stored in the memory 1505, thereby functioning as image characteristic-amount extracting means 1502a, color-information extracting means 1502b, format data generating means 1502c, color information similarity-degree calculating means 1502d, and document identifying means 1502e.

The document identifying means 1502e compares the search document with the registered document and then extracts the registered document having the highest degree of similarity as the recognition result.

The keyboard 1503 executes the instruction operation such as the registration and search of document, and the disk 1504 functions as an auxiliary storage device.

The output means 1506 is a display or printer, and outputs various information such as the recognition result.

The image of the search document read by the image input means 1501 is stored in the memory 1505 as a document image 1505b. The document image 1505b is binarized by image processing means (not shown) arranged to the processor 1502, and is sent to the image characteristic-amount extracting means 1502a. The image characteristic-amount extracting means 1502a identifies the region included in the document image by obtaining the histogram of black dots, classifies the regions included in the document image 1505b into properties such as a table, text, and picture, and extracts the resolution, positional information of regions, and size information. The color-information extracting means 1502b extracts the color information corresponding to the classified regions. The format data generating means 1502c generates the format data. Then, the format data is stored in the memory 1501 and the disk 1504.

The document identifying means 1502e compares the color information extracted by the color-information extracting means 1502b with the color information in the format data of the registered document. In this case, the processing contents are changed depending on the determination as to whether the color information of the registered document is a specific color. According to the seventh embodiment, the specific color is a color, which is not determined as the same color and is, e.g., an achromatic color with low luminance (black or the like). In the achromatic color with low luminance, the error of color deviation in the printing or scanning operation is increased, as compared with the chromatic color with high luminance. Therefore, within the allowable range of the component value used for the determination of the same color, the achromatic color is not determined as the same color by using the same value within another-color allowable range. Then, according to the seventh embodiment, the color information is not used for a part which is determined as the specific color.

Figure 16:
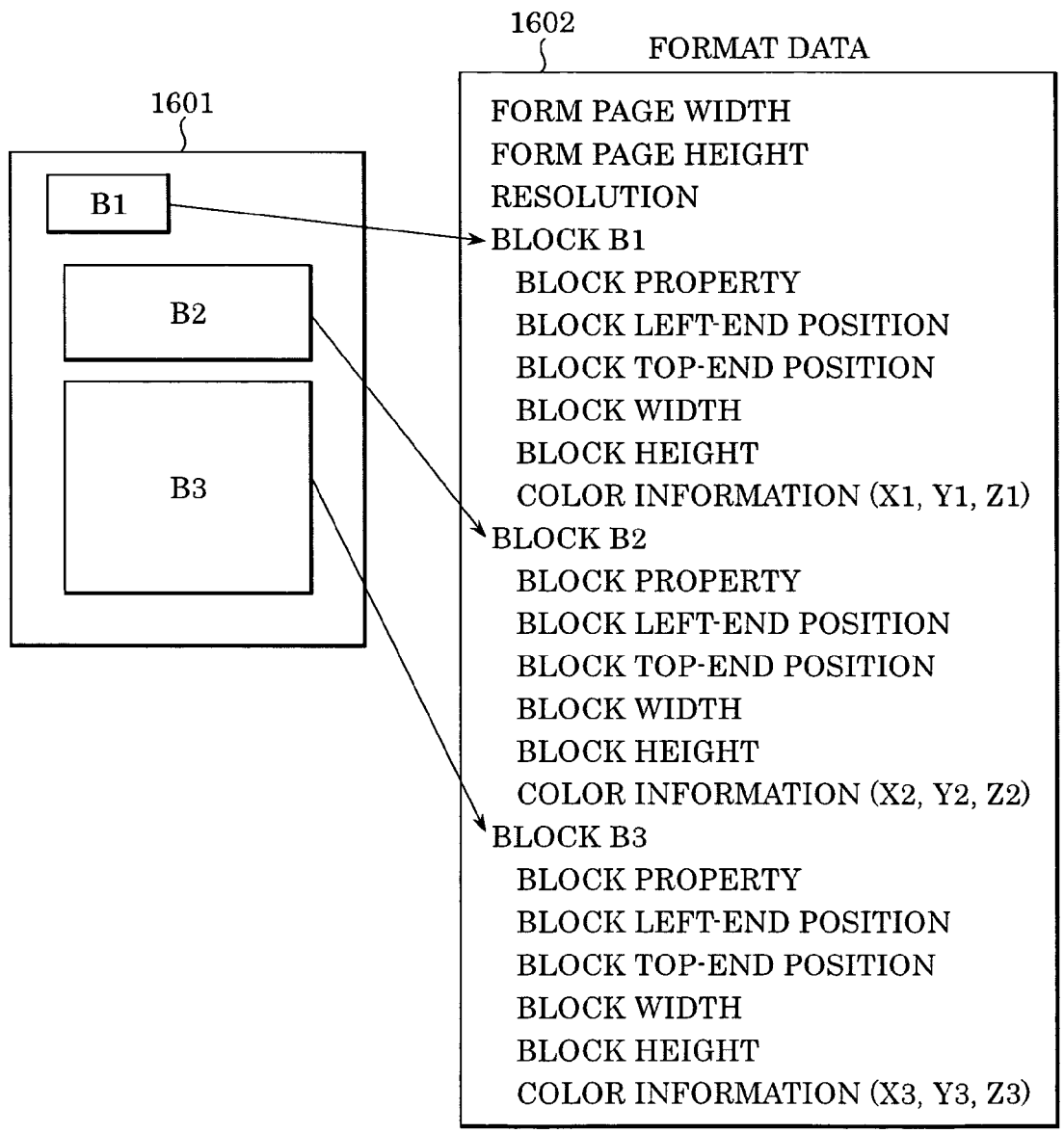
FIG. 16 is a diagram showing an example of format data according to the seventh embodiment.

FIG. 16 is a diagram showing examples of a document 1601 as the processing target and format data 1602 of the document 1601 according to the seventh embodiment.

In the examples in FIG. 16, three blocks B1, B2, and B3 (e.g., table, text, and picture) are extracted as the components of document from a document image 1601.

The format data 1602 includes page formats such as the width of document page, the height of document page, the resolution, and various information (block information) every block.

The block information includes, for example, block property (table, text, and picture) and positional information such as block left-end position and block top-end position, and size information such as the width of block and height of block. Further, the block information may also include the color information comprising RGB or CbCr information.

Figure 17:
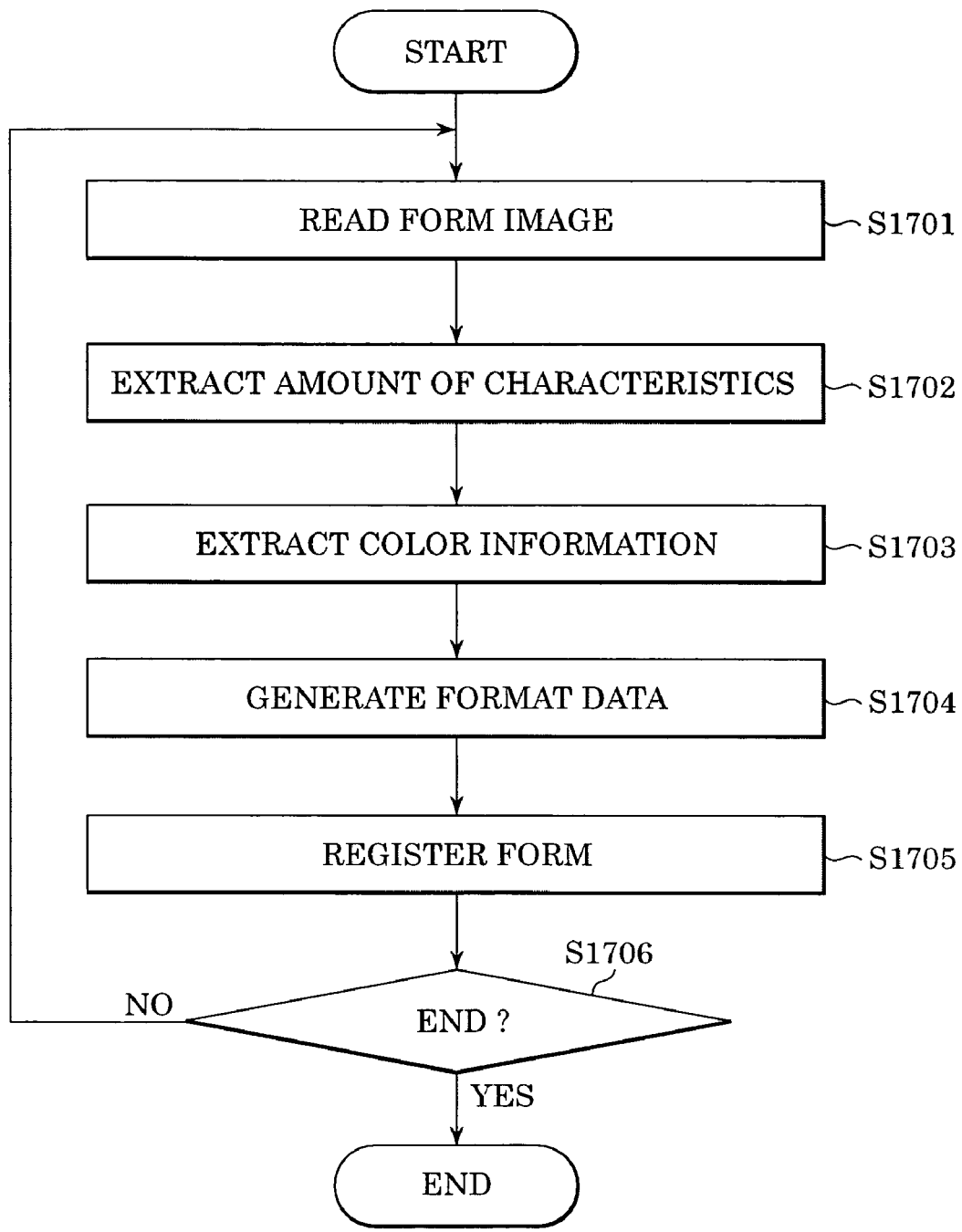
FIG. 17 is a flowchart for document registration processing according to the seventh embodiment.

FIG. 17 is a flowchart showing the document registration process according to the seventh embodiment.

Figure 18:
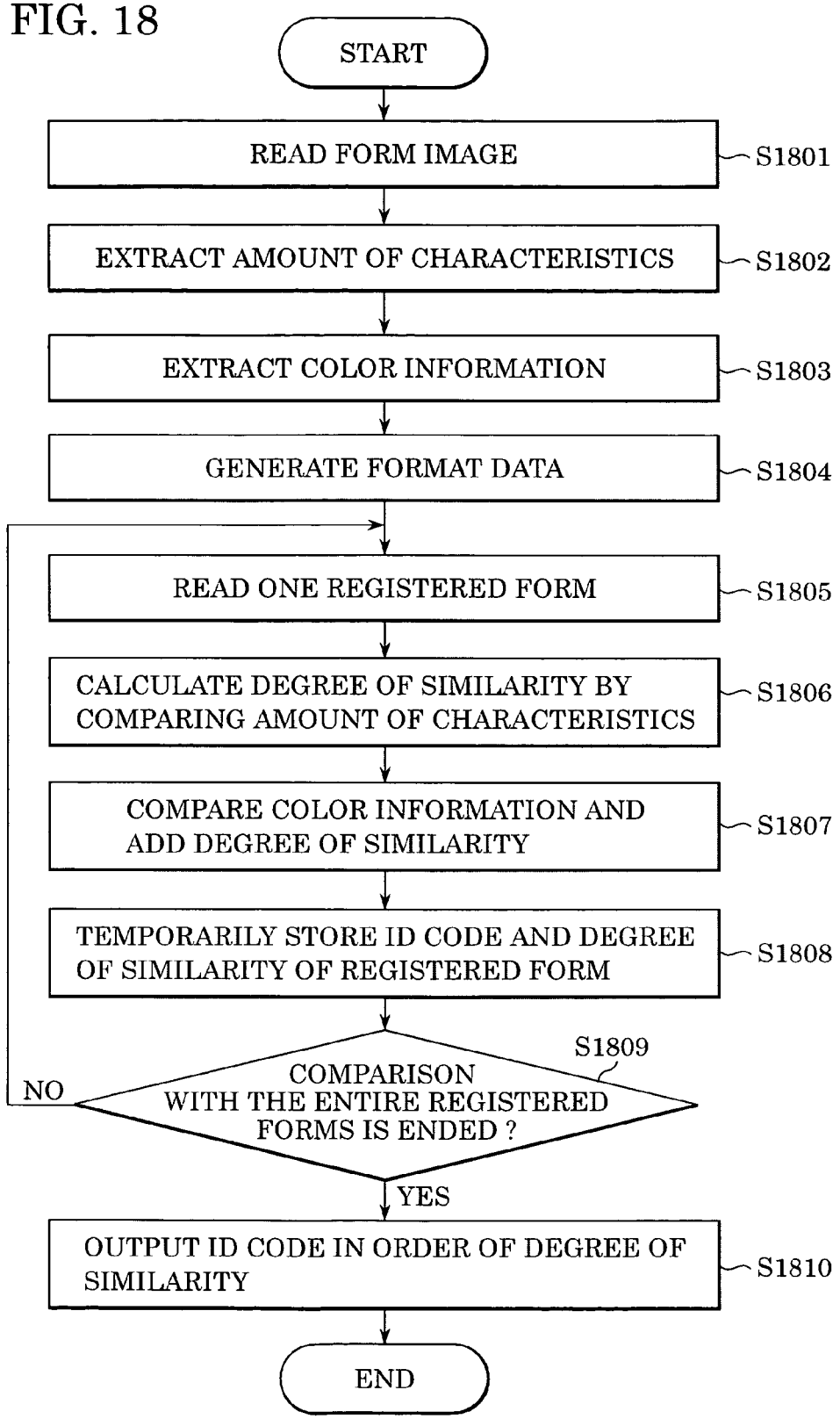
FIG. 18 is a flowchart for document recognition processing according to the seventh embodiment.
Figure 19:
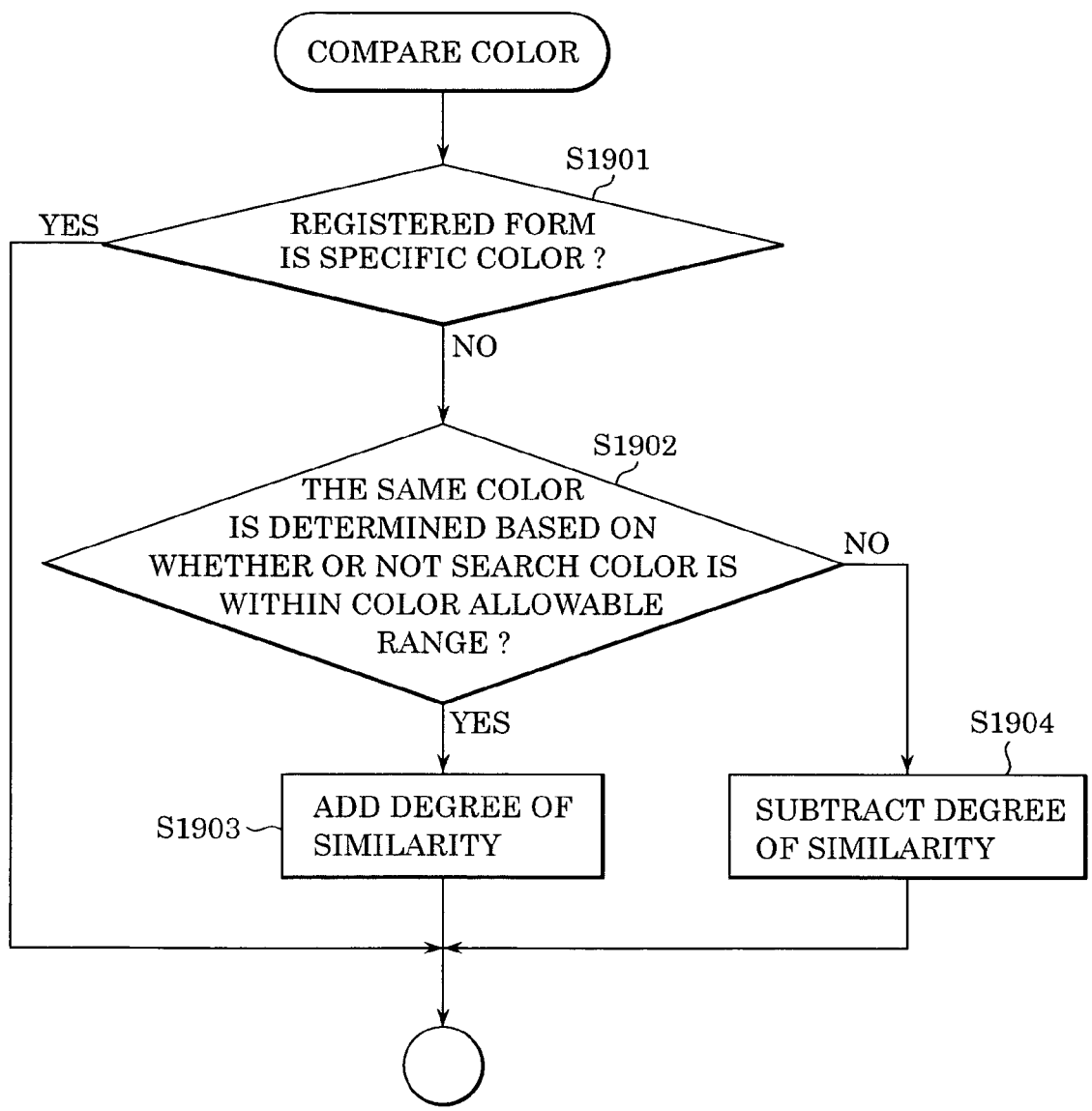
FIG. 19 is a flowchart for color information similarity-degree calculation processing according to the seventh embodiment.

FIG. 18 is a flowchart showing the document identification process according to the seventh embodiment. FIG. 19 is a flowchart showing the color information similarity-degree calculation process according to the seventh embodiment.

First, a description of the processing for registering the new document used as a template according to the seventh embodiment is provided with reference to FIG. 17.

In step S1701, the document is read from the image input means 1501, and is transferred to the memory 1505 as the document image.

In step S1702, the document image is binarized, and is divided into regions based on the binarized image. Then, shape features are extracted, for example, a coordinate value (of the region based on properties such as table, text, and picture).

In step S1703, the color information of the blocks is extracted based on shape features, such as the coordinate value of block, and the original document image input in step S1701.

In step S1704, the format data is generated from shape features obtained in step S1702 and the color information obtained in step S1703.

In step S1705, the format data generated in step S1704 is registered as the registered document together with an identification (ID) code.

In step S1706, it is determined whether the entire document images are registered. If NO in step S1706, the processing returns to step S1701. If YES in step S1706, the processing ends.

Next, a description of the document identification process according to the seventh embodiment is provided with reference to FIG. 18.

In step S1801, the document is read from the image input means 1501, and is transferred to the memory as the document image of the search document.

In step S1802, the input document image is binarized and is divided into regions having properties based on the binarized image. Then, the shape features are extracted, for example, the coordinate value of block (table, text, and picture).

In step S1803, the color information is extracted based on shape features of the block and the original document image input in step S1801.

In step S1804, the format data is generated based on shape features extracted in step S1802 and the color information extracted in step S1803.

In step S1805, one piece of format data is read as the comparison target from a plurality of registered documents.

In step S1806, shape features of the format data of the search document (coordinate value) is compared with shape features of the format data of the read registered document, and the degree of similarity is calculated from the comparison result.

In step S1807, the color information of the format data of the search document is compared with the color information of the format data of the registered document. If the color information of the format data of the search document is similar to the color information of the format data of the registered document, it is determined that the color information matches and then a predetermined value is added to the degree of similarity calculated in step S1806. Note that if the format data of the registered document is the specific color, the color information for the specific color is not compared. Therefore, the degree of similarity of color information is not added.

The comparison of color information is not determined by using the same method for all colors, whether or not the color information matches. According to the seventh embodiment, the color information for the specific color is not compared.

In step S1808, the degree of similarity for shape features or degree of similarity obtained by adding the degree of similarity of color information to the degree of similarity in shape features is temporarily stored in the memory together with the identification (ID) code of the registered document as the comparison target.

In step S1809, after step S1808, it is determined whether the comparison between the input document and the entire format data of the plurality of registered documents ends. If NO in S1809, the processing returns to step S1805. If YES in step S1809, the processing advances to step S1810.

In step S1810, the format data having the high degree of similarity is set as the candidate of the recognition result and the ID code and the degree of similarity are output.

Next, a detailed description of the color information similarity-degree calculation process in step S1807 is provided with reference to FIG. 19.

In step S1901, it is determined whether the color information is the specific color every block of the registered document. If YES in step S1901, the processing ends. If NO in step S1901, the processing advances to step S1902.

When one or plural specific colors are designated as color information (e.g., using RGB) $(Xs1, Ys1, Zs1)$, $(Xs2, Ys2, Zs2)$, ..., $(Xsn, Ysn, Zsn)$ and the color information in the format data of the registered document as the comparison target is $(Xa, Ya, Za)$, the color information $(Xa, Ya, Za)$ is compared with the color information $(Xsi, Ysi, Zsi)$ ($i=1$ to $n$). If the color information $(Xa, Ya, Za)$ matches any of the color information $(Xsi, Ysi, Zsi)$, the color information is determined as the specific color.

In step S1902, it is determined whether the value of the color information of the search document is within the allowable range of the color information in the format data of the registered document. If YES in step S1902, it is determined that the colors match. If NO in step S1902, it is determined that the colors do not match. Simultaneously, the degree of similarity of color information is calculated (e.g., the degree of similarity of color information is obtained based on the ratio of the blocks, which do not have the specific color to the blocks having the matching color information. Alternatively, the degree of similarity of color information may be calculated to a value within a predetermined ratio (e.g., 20%) of the degree of similarity of shape calculated in step S1806.

When the colors match, the processing advances to step S1903. When the colors do not match, the processing advances to step S1904.

The color information of the format data of the registered document is designated by a coordinate $(Xa, Ya, Za)$, the allowable range is designated by reference numeral Ka, and the color information of the search document is designated by a coordinate $(Xb, Yb, Zb)$. Then, if $(Xa-Ka, Ya-Ka, Za-Ka) \leq (Xb, Yb, Zb) \leq (Xa+Ka, Ya+Ka, Za+Ka)$, it is determined that the colors match.

In step S1903, the degree of similarity of color information is added to the degree of similarity for features and then the processing ends.

In step S1904, the degree of similarity of color information is subtracted from the degree of similarity for features and then the processing ends.

According to the seventh embodiment, upon recognizing the document, the document having the specific color which is erroneously determined as color is not recognized by using the color information. Thus, the erroneous recognition due to the erroneous determination of color information can be prevented and the identifying ratio can be improved.

Further, according to the seventh embodiment, the determining method is changed depending on the determination as to whether the registered color is the specific color. Further, the determining method may be changed depending on the determination as to whether the color information of the search image is the specific color.

Eighth Embodiment

Next, a description is given of a document recognition method according to the eighth embodiment. According to the eighth embodiment, the color information similarity-degree calculation process (step S1807) is different from that according to the seventh embodiment.

Figure 20:
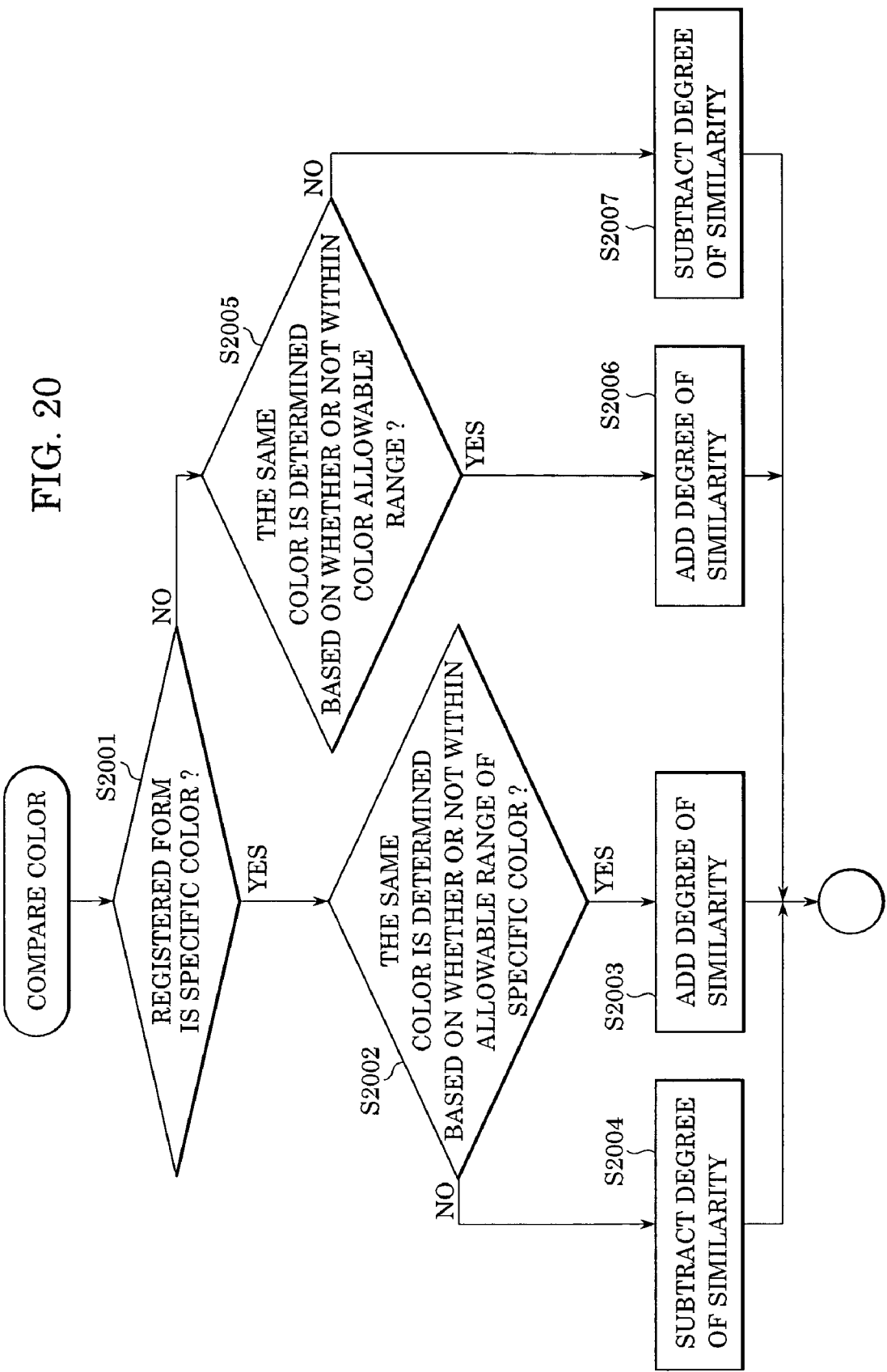
FIG. 20 is a flowchart for color information similarity-degree calculation processing according to the eighth embodiment.

FIG. 20 is a flowchart showing the color information similarity-degree calculation process according to the eighth embodiment.

According to the eighth embodiment, when the color information of the registered document is the specific color, the color information is compared within an allowable range different from that of the specific color.

Hereinbelow, a description is given, with reference to FIG. 20, of the color information similarity-degree calculating processing according to the eighth embodiment.

In step S2001, it is determined whether the color information corresponding to the features of the registered document is the specific color. If YES in step S2001, the processing advances to step S2002. If NO in step S2001, the processing advances to step S2005. The determining method of the specific color is similar to that according to the seventh embodiment.

In step S2002, it is determined whether the value of the color information of the search document is within the allowable range of the specific-color information in the format data of the registered document. If YES in step S2002, it is determined that the colors match. If NO in step S2002, it is determined that the colors do not match. Further, the degree of similarity of color information is calculated.

If the colors match, the processing advances to step S2003. If the colors do not match, the processing advances to step S2004.

It is assumed that the color information (Xb, Yb, Zb) of the search document is equal to the color information (Xs, Ys, Zs) of the specific color, the allowable range of the specific color is (Ksx, Ksy, Ksz), and the color information of the registered document is (Xa, Ya, Za). Then, if (Xa−Ksx, Ya−Ksy, Za−Ksz)≦(Xb, Yb, Zb)≦(Xa+Ksx, Ya+Ksy, Za+Ksz), it is determined that the colors match.

In step S2003, the degree of similarity of color information is added to the degree of similarity for features and then the processing ends.

In step S2004, the degree of similarity of color information is subtracted from the degree of similarity for features and then the processing ends.

In step S2005, it is determined whether the value of the color information of the search document is within the allowable range of the color information of the format data of the registered document. If YES in step S2005, it is determined that the colors match. If NO in step S2005, it is determined that the colors do not match. Further, the degree of similarity of color information is calculated.

If the colors match, the processing advances to step S2006. If the colors do not match, the processing advances to step S2007. The determination of the same color is similar to that in step S1902 according to the seventh embodiment.

The color information of the format data of the registered document is designated by a coordinate (Xa, Ya, Za), the allowable range is designated by reference numeral Ka, and the color information of the search information is designated by a coordinate (Xb, Yb, Zb). Then, if (Xa−Ka, Ya−Ka, Za−Ka)≦(Xb, Yb, Zb)≦(Xa+Ka, Ya+Ka, Za+Ka), it is determined that the colors match.

In step S2006, the degree of similarity of color information is added to the degree of similarity for the features and the processing ends.

In step S2007, the degree of similarity of color information is subtracted from the degree of similarity for the features and then the processing ends.

As mentioned above, the allowable range is varied depending on the determination as to whether the registered document is the specific color upon determining whether the colors match.

Ninth Embodiment

Next, the ninth embodiment will be described. According to the ninth embodiment, the color information similarity-degree calculation process is different from that in step S1807 according to the seventh embodiment. The individual allowable range depending on R, G, and B component values of the color information are set.

Figure 21:
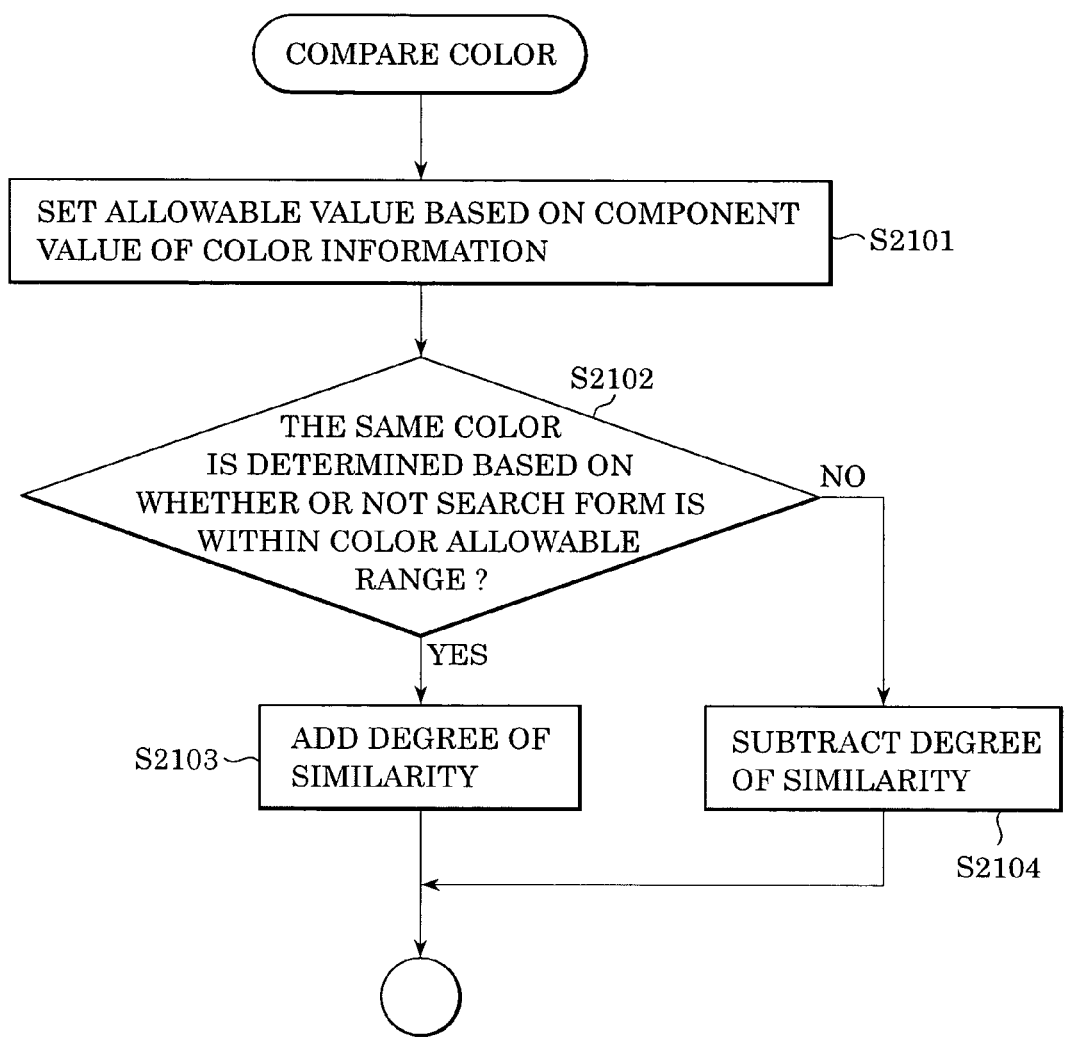
FIG. 21 is a flowchart for color information similarity-degree calculation processing according to the ninth embodiment.

FIG. 21 is a flowchart showing the color information similarity-degree calculating processing according to the ninth embodiment.

In step S2101, the allowable values are set based on the R, G, and B component values for the color information of the registered document. For example, allowable values Kx(X), Ky(Y), and Kz(Z) are preset and the color information (Xa, Ya, Za) of the registered document is set for the component values X, Y, and Z. Then, the allowable values of the component values Xa, Ya, and Za are obtained as Kx=Kx(Xa), Ky=Ky(Ya), and Kz=Kz(Za).

In step S2102, it is determined whether the value of the color information of the search document is within the allowable range of the color information of the format data of the registered document. If YES in step S2102, it is determined that the colors match. If NO in step S2102, it is determined that the colors do not match. Further, the degree of similarity of color information is calculated.

If the colors match, the processing advances to step S2103. If the colors do not match, the processing advances to step S2104. The determination of the same color is similar to that according to the seventh embodiment.

If the color information (Xb, Yb, Zb) of the search document is (Xa−Kx, Ya−Ky, Za−Kz)≦(Xb, Yb, Zb)≦(Xa+Kx, Ya+Ky, Za+Kz), it is determined that the colors match.

In step S2103, the degree of similarity is added and then the processing ends.

In step S2104, the degree of similarity is subtracted and then the processing ends.

According to the eighth and ninth embodiments, when the color information is compared, the processing is changed or the allowable range is changed depending on the colors, thereby determining the same color. Thus, the erroneous recognition of determination of the same color is prevented.

Other Embodiments

The present invention is applied to a system, an system, a method, a program or a storage medium. Specifically, the present invention can be applied to a system comprising a plurality of devices or a single system.

The objects of the present invention are accomplished by directly or remotely supplying, to the system or system, a software program (corresponding to the flowcharts in the embodiments) which realizes the functions of the embodiments and by then reading and executing supplied program code by a computer of the system or system.

In order to realize the function processing of the present invention by the computer, the program code read from the storage medium realizes the functions according to the present invention and, that is, the present invention includes the computer program for realizing the function processing according to the present invention.

In this case, the program function is provided, and then it may be a program executed by object code or interpreter or script data supplied to an OS.

The recording medium for supplying the program includes a floppy disk (registered trademark), a hard disk, an optical disk, a magneto-optical disk, an MO, a CD-ROM, a CD-R, a CD-RW, a magnetic tape, a non-volatile memory card, a ROM, and a DVD (DVD-ROM or DVD-R).

In addition, according to one supply method of the program, a homepage on the Internet is accessed by using a browser of a client computer and a computer program of the present invention from the homepage, or a compressed file including an automatic installing function is downloaded to the recording medium such as the hard disk, thus to supply the program. Further, the program code forming the program of the present invention is divided into a plurality of files and the files are downloaded from the different homepages, thereby realizing the functions of the present invention. That is, the present invention includes a World Wide Web server on which a plurality of users download a computer-readable program file for realizing the functional processing of the present invention.

In addition, the program of the present invention is encrypted, is stored in the storage medium such as the CD-ROM, and is distributed to the user. The user who clears a predetermined condition downloads key information for decrypting the program from the homepage via the Internet. Then, the encrypted program is executed by using the key information and is installed in the computer, thus to realize the functions of the present invention.

In addition, the above-mentioned functions according to the embodiments are realized by executing the program read by the computer. The OS operating on the computer executes the entire actual processing or a part thereof in accordance with an instruction of the program, and the processing realizes the functional processing of the above embodiments.

In addition, the program read from the recording medium is written to the memory included in a functional expansion board inserted in the computer or in a functional expansion unit connected to the computer. Then, the CPU of the functional expansion board or functional expansion unit executes the entire actual processing or a part thereof in accordance with the instruction of the program and the processing realizes the above-mentioned embodiments.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application Nos. 2003-398425 and 2003-398426 filed Nov. 28, 2003 and 2004-080984 filed Mar. 19, 2004, which are hereby incorporated by reference herein.

What is claimed is:

1. A document recognition device for recognizing a registered document, which is similar to an input document image, from a plurality of registered documents, the document recognition device comprising:

shape-feature extracting means which extracts the shape feature from a component included in the document image;

color-information extracting means which extracts color information from the component included in the document image;

similarity-degree calculating means which calculates the degree of similarity of shape between the document image and the registered document based on the shape feature extracted by the shape-feature extracting means;

similarity-degree correcting means which calculates the degree of similarity of color information extracted by the color-information extracting means and corrects the degree of similarity calculated by the similarity-degree calculating means based on the degree of similarity of color information;

determining means which determines whether the registered document is similar to the document image based on the degree of similarity obtained by the similarity-degree correcting means; and merging means which merges adjacent components among the components of the document image when the adjacent components have the same color information, wherein the similarity-degree calculating means calculates the degree of similarity of shape based on the components merged by the merging means and the component which are not merged, and the similarity-degree correcting means calculates the degree of similarity of color information and corrects the degree of similarity of shape.

2. A document recognition device according to claim 1, further comprising:

determining means which determines whether the degree of similarity between shape features of the document image and shape features of the registered image as serving the comparison target is a predetermined value or more, wherein the processing of the color-information extracting means, the merging means, and the similarity-degree correcting means is skipped for the registered image having a degree of similarity of shape that is the predetermined value or less as the determining result of the determining means.

3. A document recognition device according to claim 1, wherein the merging means determines that the adjacent components have the same color information and merges the components when the difference in color information between the adjacent components is within an allowable range.

4. A document recognition device for recognizing a registered document, which is similar to an input document image, from a plurality of registered documents, the document recognition device comprising:
   shape-feature extracting means which extracts the shape feature from a component included in the document image;
   color-information extracting means which extracts color information from the component included in the document image;
   similarity-degree calculating means which calculates the degree of similarity of shape between the document image and the registered document based on the shape feature extracted by the sharp-feature extracting means;
   similarity-degree correcting means which calculates the degree of similarity of color information extracted by the color-information extracting means and corrects the degree of similarity calculated by the similarity-degree calculating means based on the degree of similarity of color information;
   determining means which determines whether the registered document is similar to the document image based on the degree of similarity obtained by the similarity-degree correcting means; and
   specific-color determining means which determines whether the color information of the component in the registered document is a specific color,
   wherein the similarity-degree correcting means calculates the degree of similarity of color information based on the component for which is determined by the specific-color determining means that the color information of the component is not the specific color, and corrects the degree of similarity calculated by the similarity-degree calculating means based on the calculated degree of similarity of color information.

5. A document recognition device for recognizing a registered document, which is similar to an input document image, from a plurality of registered documents, the document recognition device comprising:
   shape-feature extracting means which extracts the shape feature from a component included in the document image;
   color-information extracting means which extracts color information from the component included in the document image;
   similarity-degree calculating means which calculates the degree of similarity of shape between the document image and the registered document based on the shape feature extracted by the shape-feature extracting means;
   similarity-degree correcting means which calculates the degree of similarity of color information extracted by the color-information extracting means and corrects the degree of similarity calculated by the similarity-degree calculating means based on the degree of similarity of color information; determining means which determines whether the registered document is similar to the document image based on the degree of similarity obtained by the similarity-degree correcting means;
   specific-color determining means which determines whether the color information of the component in the registered document is a specific color; and
   allowable-range setting means which sets an allowable range for the determination of the same color in accordance with the determination as to whether the color information of the component in the registered document is the specific color,
   wherein the similarity-degree correcting means calculates the degree of similarity of color information by comparing the color information of the search document with the color information of the registered document by using the allowable range set by the allowable-range setting means, and corrects the degree of similarity calculated by the similarity-degree calculating means based on the calculated degree of similarity of color information.

6. A document recognition method for recognition a registered document, similar to an input document image, from a plurality of registered documents, the document recognition method comprising using a computer to carry out the steps of:
   a shape-feature extracting step of extracting shape features from a component included in the document image:
   a color-information extracting step of extracting color information from the component included in the document image;
   a similarity-degree calculating step of calculating the degree of similarity of shape between the document image and the registered document based on shape features extracted in the shape-feature extracting step;
   a similarity-degree correcting step of calculating the degree of similarity of color information extracted in the color-information extracting step, and correcting the degree of similarity calculated in the similarity-degree calculating step based on the degree of similarity of color information;
   a determining step of determining whether the registered document is similar to the document image based on the degree of similarity obtained by the similarity-degree correcting step; and
   a merging step which merges adjacent components among the components of the document image when the adjacent components have the same color information,
   wherein the similarity-degree calculating step calculates the degree of similarity of shape based on the components merged in the merging step and the components which are not merged, and the similarity-degree correcting step calculates the degree of similarity of color information and corrects the degree of similarity of shape.

7. A document recognition method according to claim 6, further comprising:
   a determining step which determines whether the degree of similarity between shape features of the document image and shape features of the registered image serving as the comparison target is a predetermined value or more,
   wherein the processing of the color-information extracting step, the merging step, and the similarity-degree correcting step is skipped for the registered image having a degree of similarity of shape that is the predetermined value or less as the determining result of the determining step.

8. A document recognition method according to claim 6, wherein the merging step determines that the adjacent components have the same color information and merges the components when the difference in color information is within an allowable range between the adjacent components.

9. A document recognition method for recognizing a registered document, similar to an input document image, from a plurality of registered documents, the document recognition method comprising using a computer to carry out the steps of:

a shape-feature extracting step of extracting shape features from a component included in the document image;

a color-information extracting step of extracting color information from the component included in the document image;

a similarity-degree calculating step of calculating the degree of similarity of shape between the document image and the registered document based on shape features extracted in the shape-feature extracting step;

a similarity-degree correcting step of calculating the degree of similarity of color information extracted in the color-information extracting step, and correcting the degree of similarity calculated in the similarity-degree calculating step based on the degree of similarity of color information;

a determining step of determining whether the registered document is similar to the document image based on the degree of similarity obtained by the similarity-degree correcting step; and a specific-color determining step which determines whether the color information of the component in the registered document is a specific color, wherein the similarity-degree correcting step calculates the degree of similarity of color information based on the component for which is determined by the specific-color determining step that the color information of the component is not the specific color, and corrects the degree of similarity calculated by the similarity-degree calculating step based on the calculated degree of similarity of color information.

10. A document recognition method for recognizing a registered document, similar to an input document image, from a plurality of registered documents, the document recognition method comprising using a computer to carry out the steps of:

a shape-feature extracting step of extracting shape features from a component included in the document image;

a color-information extracting step of extracting color information from the component included in the document image;

a similarity-degree calculating step of calculating the degree of similarity of shape between the document image and the registered document based on shape features extracted in the shape-feature extracting step;

a similarity-degree correcting step of calculating the degree of similarity of color information extracted in the color-information extracting step, and correcting the degree of similarity calculated in the similarity-degree calculating step based on the degree of similarity of color information;

a determining step of determining whether the registered document is similar to the document image based on the degree of similarity obtained by the similarity-degree correcting step;

a specific-color determining step of determining whether the color information of the component in the registered document is a specific color; and an allowable-range setting means which sets an allowable range for the determination of the same color in accordance with the determination as to whether the color information of the component of the registered document is the specific color, wherein the similarity-degree correcting step calculates the degree of similarity of color information by comparing the color information of the search document with the color information of the registered document by using the allowable range set by the allowable-range setting step, and corrects the degree of similarity calculated by the similarity-degree calculating means based on the calculated degree of similarity of color information.

* * * * *